(12) United States Patent
Johnson, Jr. et al.

(10) Patent No.: US 12,197,181 B2
(45) Date of Patent: Jan. 14, 2025

(54) TEMPERATURE CONTROL SYSTEM AND METHODS FOR OPERATING SAME

(71) Applicant: Johnson Solid State, LLC, Washington, MI (US)

(72) Inventors: David Johnson, Jr., Washington, MI (US); Valerie Jean Johnson, Washington, MI (US); John Edward Dumar, Mt. Clemens, MI (US); David L. Johnson, Sr., Washington, MI (US)

(73) Assignee: Johnson Solid State, LLC, Washington, MI (US)

( * ) Notice: Subject to any disclaimer, the term of this patent is extended or adjusted under 35 U.S.C. 154(b) by 767 days.

(21) Appl. No.: 17/389,726

(22) Filed: Jul. 30, 2021

(65) Prior Publication Data

US 2021/0356927 A1 Nov. 18, 2021

Related U.S. Application Data

(60) Continuation-in-part of application No. 16/785,550, filed on Feb. 7, 2020, now abandoned, and a
(Continued)

(51) Int. Cl.
*G05B 19/04* (2006.01)
*F24F 11/30* (2018.01)
(Continued)

(52) U.S. Cl.
CPC .......... *G05B 19/0428* (2013.01); *F24F 11/30* (2018.01); *F24F 11/62* (2018.01);
(Continued)

(58) Field of Classification Search
None
See application file for complete search history.

(56) References Cited

U.S. PATENT DOCUMENTS 6,629,886 B1 * 10/2003 Estepp ................... F24F 11/745
454/236
7,992,630 B2    8/2011 Springer
(Continued)

FOREIGN PATENT DOCUMENTS

CA            2906287 A1 *  9/2014  .............. F24F 11/30

OTHER PUBLICATIONS

International Search Report and Written Opinion—PCT/US15/46185.
(Continued)

*Primary Examiner* — Mohammad Ali
*Assistant Examiner* — Kelvin Booker
(74) *Attorney, Agent, or Firm* — Mitchell Law PLLC; Matthew W. Mitchell

(57) ABSTRACT

A method for operating a temperature control system for a structure is disclosed. The method includes monitoring historical data, and controlling the temperature control system to inject outdoor air into the supply duct of the temperature control system based upon historical data. Some embodiments of the system include monitoring an interior and exterior temperature of a structure, defining a first time range and a second time range, associating one or more operating parameters of the temperature control system with the first time range and the second time range, monitoring operational time and operational load of the cooling system for the first time range, and controlling a ventilation subsystem during the second time range based upon the monitored operational time and operational load of the cooling subsystem for the first time range, and the one or more operating parameters of the cooling subsystem associated with the second time range.

25 Claims, 23 Drawing Sheets

Related U.S. Application Data continuation-in-part of application No. 16/450,230, filed on Jun. 24, 2019, now Pat. No. 11,156,978, which is a division of application No. 15/231,943, filed on Aug. 9, 2016, now Pat. No. 10,871,756, which is a continuation-in-part of application No. 14/830,807, filed on Aug. 20, 2015, now Pat. No. 9,447,985.

(60) Provisional application No. 62/802,255, filed on Feb. 7, 2019, provisional application No. 62/041,701, filed on Aug. 26, 2014.

(51) Int. Cl.
| | | |
|---|---|---|
| *F24F 11/46* | (2018.01) | |
| *F24F 11/62* | (2018.01) | |
| *G05B 15/02* | (2006.01) | |
| *G05B 19/042* | (2006.01) | |
| *F24F 11/00* | (2018.01) | |
| *F24F 110/10* | (2018.01) | |
| *F24F 110/12* | (2018.01) | |
| *F24F 110/22* | (2018.01) | |
| *F24F 140/50* | (2018.01) | |
| *F24F 140/60* | (2018.01) | |

(52) U.S. Cl.
CPC ...... *G05B 15/02* (2013.01); *F24F 2011/0002* (2013.01); *F24F 11/46* (2018.01); *F24F 2110/10* (2018.01); *F24F 2110/12* (2018.01); *F24F 2110/22* (2018.01); *F24F 2140/50* (2018.01); *F24F 2140/60* (2018.01); *G05B 2219/2614* (2013.01); *G05B 2219/2642* (2013.01)

(56) References Cited

U.S. PATENT DOCUMENTS

| | | | |
|---|---|---|---|
| 8,180,493 B1 | 5/2012 | Laskow | |
| 9,429,923 B2 | 8/2016 | Ward et al. | |
| 9,500,386 B1 * | 11/2016 | Walsh | G05D 23/1951 |
| 10,871,756 B2 * | 12/2020 | Johnson, Jr. | G05B 15/02 |
| 10,908,578 B2 * | 2/2021 | Johnson, Jr. | F24F 11/62 |
| 10,921,768 B2 * | 2/2021 | Johnson, Jr. | F24F 11/63 |
| 11,156,978 B2 * | 10/2021 | Johnson, Jr. | F24F 11/76 |
| 2002/0090908 A1 * | 7/2002 | Estepp | F24F 11/745 |
| | | | 454/236 |
| 2004/0253918 A1 | 12/2004 | Ezell et al. | |
| 2005/0156052 A1 | 7/2005 | Bartlett | |
| 2006/0207272 A1 | 9/2006 | Hirayama et al. | |
| 2006/0234621 A1 * | 10/2006 | Desrochers | F24F 3/044 |
| | | | 702/50 |
| 2010/0307733 A1 * | 12/2010 | Karamanos | F24F 11/84 |
| | | | 165/254 |
| 2011/0155354 A1 * | 6/2011 | Karamanos | F24F 13/0245 |
| | | | 29/428 |
| 2012/0006525 A1 | 1/2012 | Lafleur | |
| 2012/0071082 A1 * | 3/2012 | Karamanos | F24F 5/0003 |
| | | | 29/890.03 |
| 2012/0145802 A1 | 6/2012 | Peterson | |
| 2013/0255297 A1 | 10/2013 | Matsuoka | |
| 2016/0061473 A1 * | 3/2016 | Johnson, Jr. | F24F 11/64 |
| | | | 700/276 |
| 2016/0348936 A1 * | 12/2016 | Johnson, Jr. | G05B 15/02 |
| 2017/0153031 A1 * | 6/2017 | Pavol | F24F 11/0001 |
| 2017/0153039 A1 * | 6/2017 | Dorste | F24F 11/46 |
| 2017/0167744 A1 * | 6/2017 | Arensmeier | F24F 11/30 |
| 2017/0268797 A1 * | 9/2017 | Mowris | F24H 9/2064 |
| 2017/0292725 A1 * | 10/2017 | Conley | F24F 11/39 |
| 2018/0094827 A1 * | 4/2018 | Knight | F24F 11/30 |
| 2018/0274812 A1 * | 9/2018 | Dorste | F24F 13/222 |
| 2018/0299155 A1 * | 10/2018 | Walsh | F24F 11/58 |
| 2019/0324420 A1 * | 10/2019 | Johnson, Jr. | F24F 11/62 |
| 2019/0324421 A1 * | 10/2019 | Johnson, Jr. | F24F 11/62 |
| 2020/0125058 A1 * | 4/2020 | Johnson, Jr. | F24F 11/76 |

OTHER PUBLICATIONS

International Search Report—PCT/US2016/052556.
International Preliminary Report on Patentability—PCT/US2016/052556.
International Written Opinion—PCT/US2016/052556.

* cited by examiner

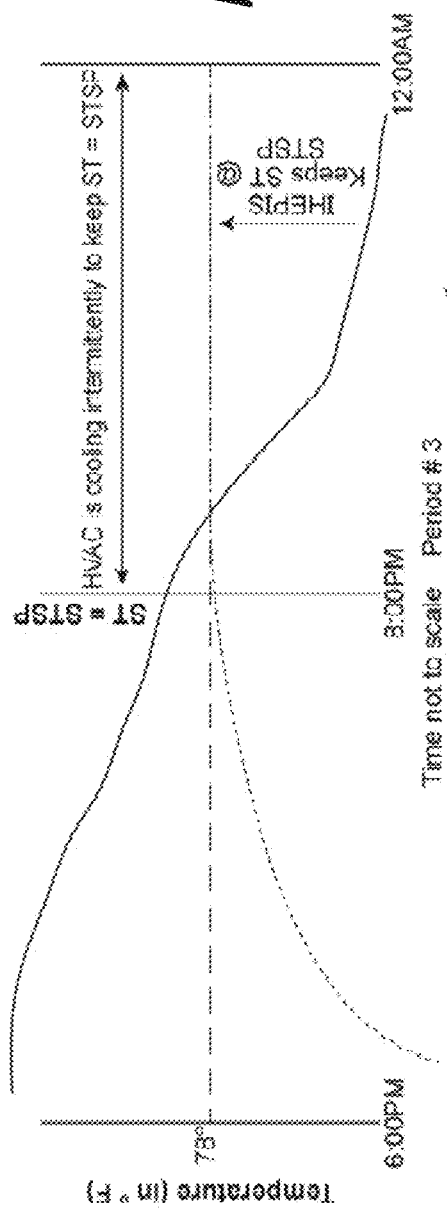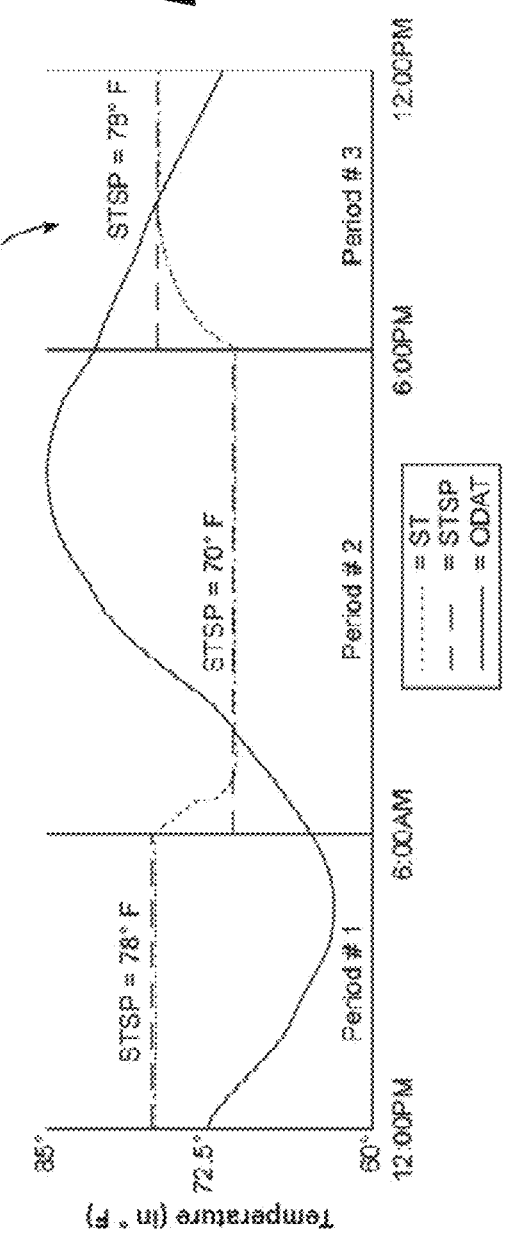
FIG. 10A
FIG. 10B

TEMPERATURE CONTROL SYSTEM AND METHODS FOR OPERATING SAME

CROSS-REFERENCE TO RELATED APPLICATION(S)

This application is a continuation-in-part of U.S. patent application Ser. No. 16/451,038, filed Jun. 25, 2019, a divisional which claims the benefit of patent application of U.S. patent application Ser. No. 15/231,943, filed Aug. 9, 2016, a continuation-in-part of U.S. patent application Ser. No. 14/830,807, filed Aug. 20, 2015, which claims the benefit of U.S. Provisional Application Ser. No. 62/041,701, filed Aug. 26, 2014; This application is a continuation-in-part of U.S. patent application Ser. No. 16/785,550, filed Feb. 7, 2020, which claims the benefit of U.S. Provisional Patent Application No. 62/802,255, filed Feb. 7, 2019, all of which are hereby incorporated herein by reference for all purposes.

TECHNICAL FIELD

This disclosure relates to temperature control of buildings and other structures, and more particularly to predictive systems and methods for heating, cooling and/or ventilating buildings and other structures.

BACKGROUND

The statements in this section merely provide background information related to the present disclosure and may not constitute prior art.

Temperature control systems such as heating, ventilation, and air conditioning (HVAC) systems of structures, are operable to condition the interior air of the structure, i.e., to selectively heat and cool the interior air of the structure. The HVAC system includes mechanical systems for heating and cooling air that is delivered into the interior of the structure via ductwork, to selectively heat or cool the interior air.

Many HVAC systems have electronically controlled exterior air dampers, which are capable (when used in conjunction with the blower of the HVAC system) of circulating "fresh" exterior air into the structure. In addition to HVAC systems having mechanical means (cooling systems, often utilizing compressor(s), condenser fans, blower motors, etc.) to condition the space of the structure, many HVAC systems have the means to utilize cool exterior air to condition the space, via an exterior air damper (also referred to as an "economizer").

Many structures have electronically controlled exhaust systems, which are capable of exhausting air from the structure. Often, a structure's exhaust system(s) draws air from near the roof of the structure, and exhausts that air to the outside of the structure.

The operation of the mechanical systems, e.g., cooling, heating, and/or ventilation systems, consumes energy, adds wear and tear to the equipment, and increases the failure rate of that equipment, which may be financially costly. As such, it is desirable to condition the interior air of the structure to desired temperatures by utilizing predictive data.

SUMMARY

A method for operating a temperature control system for a structure is disclosed. The method includes monitoring historical data, and controlling the temperature control system to inject outdoor air into the supply duct of the temperature control system based upon historical data. Some embodiments of the system include monitoring an interior and exterior temperature of a structure, defining a first time range and a second time range, associating one or more operating parameters of the temperature control system with the first time range and the second time range, monitoring operational time and operational load of the cooling system for the first time range, and controlling a ventilation subsystem during the second time range based upon the monitored operational time and operational load of the cooling subsystem for the first time range, and the one or more operating parameters of the cooling subsystem associated with the second time range.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which:

FIGS. 10A and 10B graphically illustrates exemplary operating metrics of the temperature control system, in accordance with the present disclosure.

DETAILED DESCRIPTION

Figure 1:
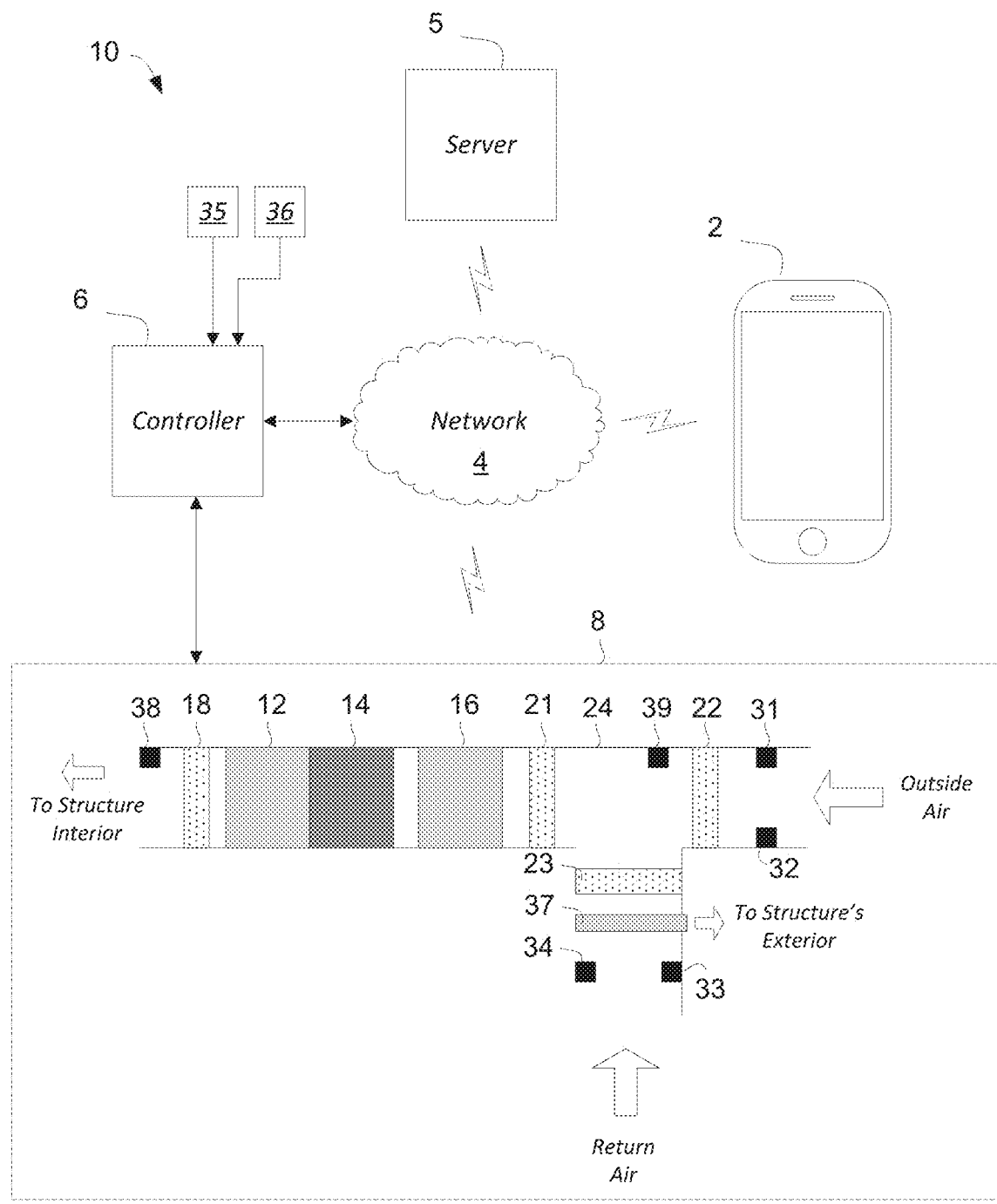
FIG. 1 schematically shows an exemplary HVAC system, in accordance with the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based upon" is not exclusive and allows for being based upon additional factors not described, unless the context clearly dictates otherwise. The word "exemplary" is used herein to mean "serving as an example, instance, or illustration." Any embodiment described herein as "exemplary" is not necessarily to be construed as preferred or advantageous over other embodiments. As used herein the terms building and structure may be used interchangeably. Upon a careful reading of the teachings herein, one skilled in the art may readily apply the teachings to any number of building and structure types falling within the spirit of this disclosure.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Referring now to the drawings, wherein the depictions are for the purpose of illustrating certain exemplary embodiments only and not for the purpose of limiting the same, FIG. 1 schematically shows an exemplary temperature control system 10 that may help implement the methodologies of the present disclosure. The system 10 may include various HVAC equipment components 8 configured to condition the interior air of the structure, i.e., to selectively heat and cool the interior air of the structure. The system 10 includes a controller 6 for controlling the HVAC equipment components 8. In various embodiments, the system 10 may include a server 5, a network 4 and/or a mobile device 2. The methods and devices of the present disclosure may be practiced with the HVAC system 10 and/or as part of HVAC system 10.

The server 5 may be directly communicatively connected to the controller 6 and the mobile device 2 or communicatively connected via the network 4. The server 5 may be: various embodiments of a computer including high-speed microcomputers, minicomputers, mainframes, and/or data storage devices. The server 5 preferably executes database functions including storing and maintaining a database and processes requests from the controller 6 and/or mobile device 2 to extract data from, or update, a database as described herein below. The server 5 may additionally provide processing functions for the mobile device 2 and the controller 6 as will become apparent to those skilled in the art upon a careful reading of the teachings herein.

As shown in FIG. 1, the HVAC controller 6 may be directly communicatively connected to one or more of the HVAC equipment components 8 including one or more sensors 31, 32, 33, and/or 34. In one embodiment, the controller 6 is wirelessly connected to the one or more HVAC equipment components 8 via the network 4. In embodiments utilizing a mobile device 2, the mobile device 2 may be physically or wirelessly connected to the network 4 and/or the controller 6 during selected periods of operation without departing from the teachings herein. Components of the system 10 are shown in FIG. 1 as single elements. Such illustration is for ease of description and it should be recognized that the system 10 may include multiple additional components in various embodiments without departing from the teachings herein. For example, in various embodiments the controller 6 may be incorporated into the server 5.

The exemplary HVAC system 10 shown in FIG. 1 includes an HVAC controller 6, which may be or may include a thermostat or a hydronic heat transfer system control in some embodiments. The HVAC controller 6 may be configured to communicatively interact with and control various components of the HVAC components 8. As shown in FIG. 1, the HVAC controller 6 may be directly connected to the HVAC components 8 or connected via a network 4 which may be a locally based network or a wider network such as the Internet. In various embodiments, the mobile device 2 is communicatively connected to the controller 6 so that a user may control the HVAC components 8 using the mobile device 2 via the controller 6.

The HVAC components 8 may include a heating system 12, a cooling system 14, a ventilation system 16 including a fan, i.e., a blower, a humidification system 18 and/or any other HVAC components or systems, as desired such as an outside air damper 22 or intake damper 23. In various embodiments, HVAC components include auxiliary heating and cooling equipment. Exhaust fans 37 and supply air fans 16, removing air from the structure, and moving air into the structure, respectively, may also be used in various embodiments. The HVAC components 8 primarily function as a forced air system although auxiliary HVAC components may be used in conjunction to supplement conditioning of the environment within the building. For example, auxiliary heat may be provided by electrical resistive heaters, hot water radiant heat, boilers, and/or electric base board heaters in various embodiments.

As illustrated in exemplary FIG. 1, the heating system 12 and the cooling system 14 are combined in a forced air system; however, it is contemplated herein that the heating and cooling systems 12 and 14 may be separated. For example, in residential and/or light commercial applications, in various embodiments, a heat pump system may be utilized separate from an air conditioning cooling system 14.

In various embodiments the HVAC components 8 include any number of intake and outtake dampers. In the illustrated embodiment a filter 21, a first damper 22, and a second damper 23 are utilized consistent with the teachings herein. The damper 22 may be in communication with outside air and the fan 16 is in communication with one or more of the dampers 22 and 23 within a ducting 24, for example. The dampers 22 and 23 may be selectively actuatable as a group or individually in various embodiments.

The HVAC components 8 may include cooling equipment, which may include more than one unit and/or more than one stage of cooling. The HVAC components 8 are selectively in gaseous communication with exterior ambient air and including operability to intake and/or vent exterior ambient air. In various embodiments the ventilation equipment may provide different levels of air movement as described herein below. The HVAC components 8 may include other units such as a humidifier unit, a dehumidifier unit, a UV filter unit and/or any other suitable HVAC unit and/or equipment as desired.

The HVAC components 8 may include one or more sensors, such as an exterior ambient air temperature sensor 31, an exterior humidity sensor 32, a return temperature sensor 33, and/or a smoke detector 34. The sensors 31, 32, 33, and 34 may be directly or indirectly communicatively connected to the controller 6. The exterior ambient temperature sensor 31 is configured to measure a temperature of the outside air and, for example, may be mounted to an exterior of the building, or factory installed as part of the HVAC components 8. The exterior humidity sensor 32 may also be mounted external to ducting of the HVAC components 8 or factory installed as part of the HVAC components 8. An interior temperature sensor 35 measures a temperature of the interior air of the building. The sensor 35 may be internal to the controller 6 or external. Optionally, an interior humidity sensor 36 measures the humidity of the interior air of the structure. The sensor 36 may be internal to the controller 6 or external. In one embodiment, the controller 6 may obtain outside, i.e., exterior air temperature and/or humidity conditions through an online weather service or may be in communication with a building automation system having equivalent measuring functionality. In one embodiment, predicted weather conditions may be utilized by the controller 6. In various embodiments, the interior and exterior humidity sensors 36 and 32 are optional. In various embodiments, sensors 33 and 34 are optional.

The network 4 may be any suitable series of points or nodes interconnected by communication paths. The network 4 may be interconnected with other networks and contain sub network(s) such as, for example, a publicly accessible distributed network like the Internet or other telecommunications networks (e.g., intranets, virtual nets, overlay networks and the like). The network 4 may facilitate the exchange of data between and among the HVAC components 8, the HVAC controller 6, and the sensors 31, 32, 33, 34, 35 and 36; although in various embodiments the HVAC controller 6 may be directly connected to the HVAC components 8 and/or the sensors 31, 32, 33, 34, 35 and 36.

In various embodiments, the mobile device 2 may include one or more applications that the user may operate. Operation may include downloading, installing, turning on, unlocking, activating, or otherwise using the application in conjunction with the controller 6. The application may comprise at least one of an algorithm, software, computer code, executable instruction sets and/or the like, for example, mobile application software. In the alternative, the application may be utilized remotely through a website accessible through the world wide web.

Figure 2:
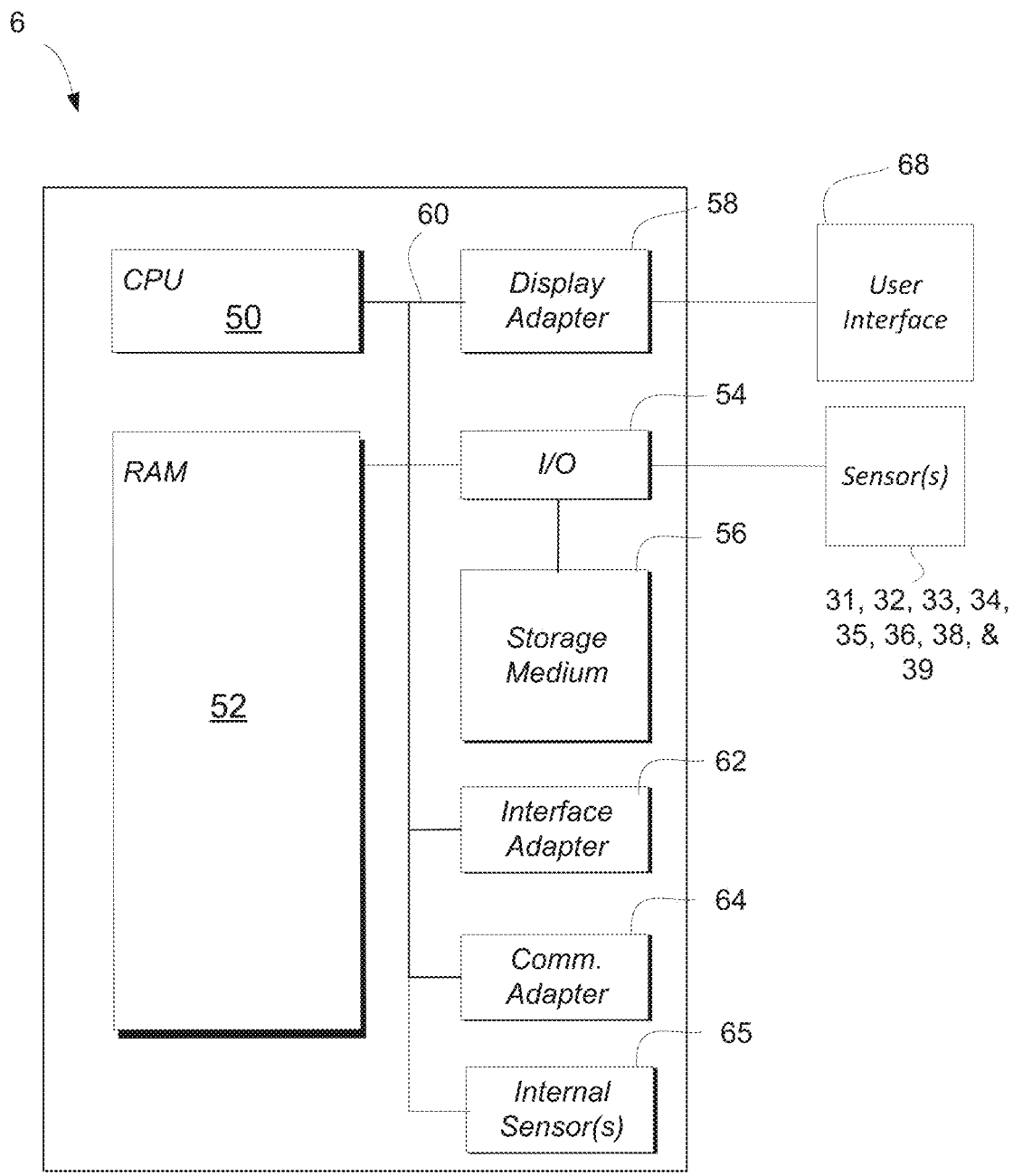
FIG. 2 schematically shows an exemplary HVAC controller, in accordance with the present disclosure.

FIG. 2 shows the exemplary HVAC controller 6. The controller 6 includes a central processing unit (CPU) 50, random access memory (RAM) 52, input/output circuitry 54 for connecting peripheral devices such as a storage medium 56 to a system bus 60, a display adapter 58 for connecting the system bus 60 to a display device, a user interface adapter 62 for connecting user input devices such as various dials buttons and/or keypads, to the system bus 60, and a communication adapter 64 for connecting the controller 6 to the network 4. The memory 52 and storage medium 56 may be used to store any appropriate information such as HVAC control routines or code, historical performance data, HVAC system and/or HVAC controller parameters, one or more programmable schedules for changing HVAC system parameters over time, etc.

The central processing unit 50 is preferably one or more general-purpose microprocessor or central processing unit(s) and has a set of control algorithms, comprising resident program instructions and calibrations stored in the memory 52 and executed to provide the desired functions. In one embodiment, an application program interface (API) is preferably executed by the operating system for computer applications to make requests of the operating system or other computer applications. The description of the central processing unit 50 is meant to be illustrative, and not restrictive to the disclosure, and those skilled in the art will appreciate that the disclosure may also be implemented on platforms and operating systems other than those mentioned.

The HVAC controller 6 may include any number of suitable components related to effecting control of the HVAC system 10. For example, HVAC controller 6 may include a user interface 68 which may be graphical. The user interface 68 may include one or more displays, switches, and/or buttons that a user may actuate or otherwise control. In one embodiment, a touchscreen display may be provided to display the user interface 68 and provide interaction therewith.

In one embodiment, one or more of a cooling device, heating equipment and/or ventilation equipment may be distinct systems controlled, either directly or indirectly, by the HVAC controller 6. In some embodiments, it is contemplated that the HVAC controller 6 may separately control each component 8. HVAC system parameters may include set points for heating, cooling, humidity, etc., modes for ventilation equipment, fan settings, and the like and as further described below.

The HVAC controller 6 may include one or more internal sensors 65, such as a temperature sensor and/or a humidity sensor. The internal sensors 65 may be in addition to the sensors 35 and 36 and may be used for supplemental or redundancy purposes, as exemplary. The HVAC controller 6 may include one or more outputs configured to issue operation commands to the HVAC components 8. It is contemplated herein that the HVAC controller 6 may be configured to execute any method of the present disclosure. The HVAC controller 6 may be communicatively connected to one or more sensors connected external to a building structure and external to a housing of the controller 6. The connection may be via wire or via a wireless embodiment of the network 4.

In various embodiments, the HVAC controller 6 may maintain in its memory an operating schedule that may be used to control the HVAC system based upon time and/or day. The schedule may, for example, be a daily programmable schedule or any other schedule. In some cases, the schedule may have a number of days and one or more time periods for each of at least some of the days. In some instances, the nominal schedule may include an "occupied", an "unoccupied", and a "stand-by" time period for each of the days of a week. The schedule may have at least one set point associated with each of the one or more time periods. The schedule may be maintained in the memory 52, and may be modified by an end user in various embodiments.

Figure 3:
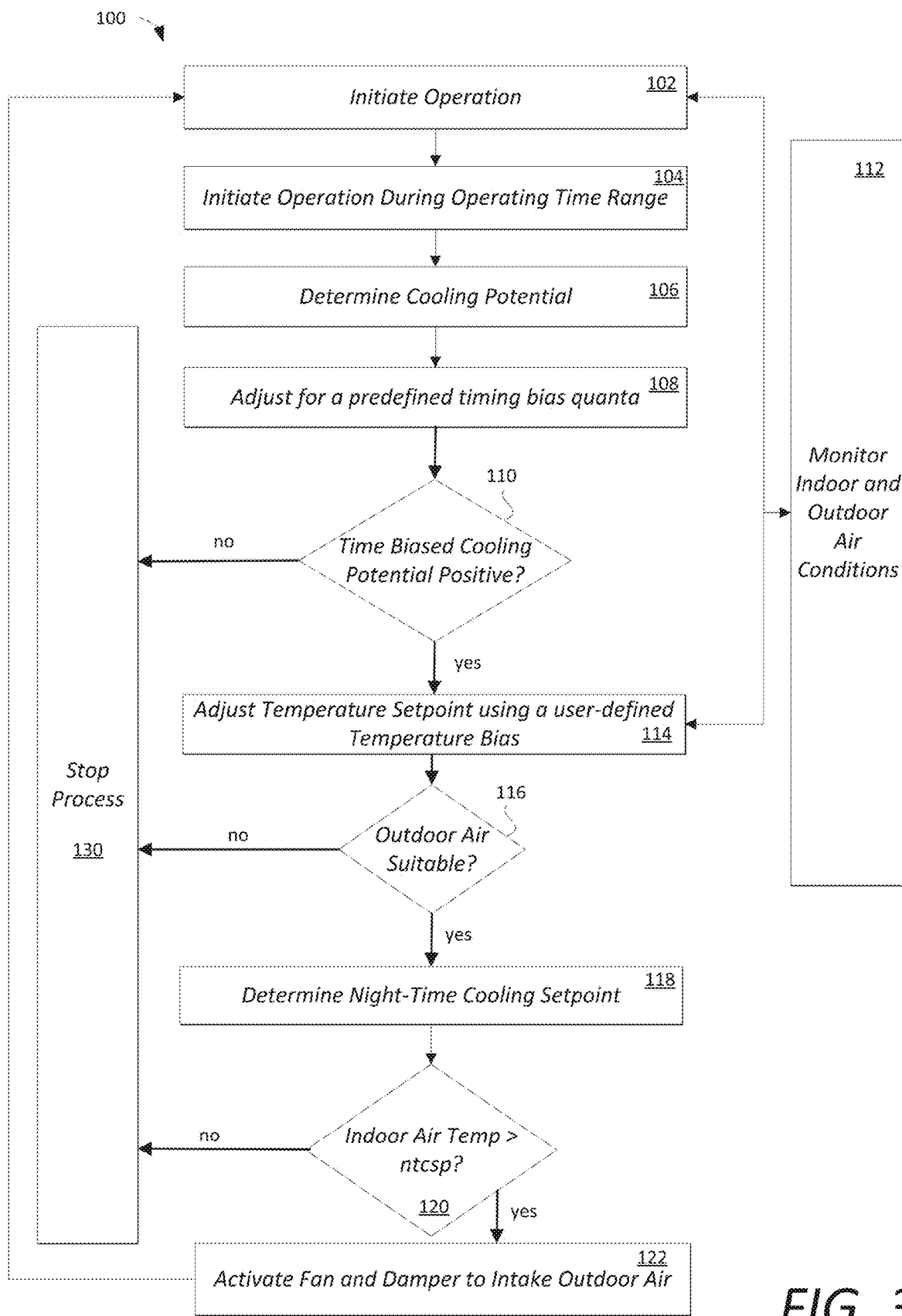
FIG. 3 is a control scheme for operating the exemplary HVAC system, in accordance with the present disclosure.

FIG. 3 shows a control scheme 100 for operating the controller 6 and the HVAC components 8. Although the control scheme 100 is shown as discrete elements, such an illustration is for ease of description and it should be recognized that the functions performed by the control scheme 100 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

Figure 7:
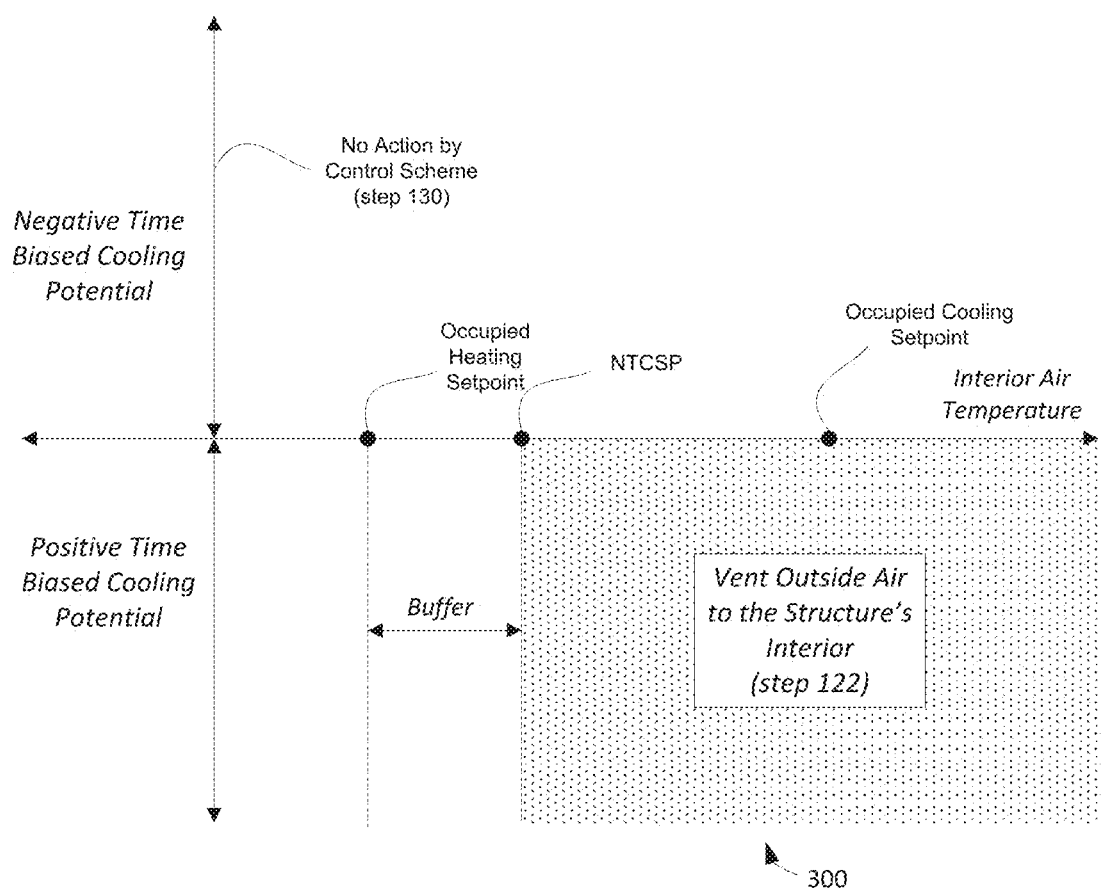
FIG. 7 graphically shows operation of the HVAC system for venting outside air into a structure with respect to indoor temperature, in accordance with the present disclosure.

The control scheme 100 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 100 is configured, in one exemplary implementation, to operate one or more of the HVAC components 8 using the controller 6 to condition the interior environment. As FIG. 3 shows, the control scheme 100 is initiated at step 102 whereby the controller 6 operates the HVAC components 8 based upon a user's predefined or default operating parameters, and the results of a prior iteration of the control scheme 100. In the exemplary case of cooling the interior air of a building, the control scheme 100 operates during cool mornings to proactively ventilate the building with cool exterior air based upon the operation of the HVAC components 8 during a previous period, e.g., during the previous day.

In one embodiment, the HVAC components 8 may transition between an occupied state and an unoccupied state. In one embodiment, the control scheme 100 is operated only at a predetermined time range. While operating in an occupied state, the controller 6 typically operates to maintain interior air conditions at desired levels, for example, levels directed at maintaining comfortable conditions for occupants, e.g., a user-supplied set point. In one embodiment, while in the predetermined time range, the controller 6 executes the control scheme 100 to maintain interior air conditions at a second set of preferential conditions, which may be directed at a different set of objectives, e.g., energy conservation, equipment wear reduction, and/or improvement of indoor air quality.

In one embodiment, operation of one or more of the HVAC components 8 may be based upon operation that occurred during the previous period. The previous period may be, for example the previous day, i.e., the previous 24 hours. Alternatively, the previous period may be, for example, the previous day less any time duration during which the process 100 operated. For example, if the process 100 operated for two hours during the previous day (for example, from 4:00 am to 6:00 am), the previous period may be 22 hours (i.e., 24 hours minus 2 hours).

At step 104, the controller 6 may execute the control scheme 100 during a predefined operating time range. The controller 6 may then deactivate the control scheme 100 after or outside of the predefined operating time range. The operating time may be between 4:00 am and 6:00 am, for example. In one embodiment, the operating time range may be user-defined. Alternatively, the operating time range may initiate at any suitable predefined time and may last for any suitable predefined duration. In one embodiment, operating time may be defined based upon occurrence of an event. In one embodiment, operating time may begin at any suitable predefined time, and not terminate until block 116 or block 120 of FIG. 3 is "no". In one embodiment, operating time may be defined based upon historical trending of the coolest part of the day. As exemplary, a photocell could be utilized to estimate a time of dawn, and then, in turn, apply that time to the next day's predetermined start and stop times of the operating range. In one embodiment, a start and stop time of the control scheme 100 may be determined based upon monitored exterior air temperature. For example, a time associated with a lowest temperature reading may be set as the start time or a predetermined time period before the monitored lowest temperature may be set as the start time and a predefined duration after the start time may be calculated for the stop time.

At step 106, the control scheme 100 determines a cooling potential of the interior air based upon the previous period, e.g., the previous day. Determining the cooling potential includes determining the cooling usage of the HVAC components 8 from the previous period, e.g., the previous day. More specifically, determining the cooling potential includes adding the sum of the products of cooling load output and run time of the HVAC components 8 from the previous period, which may be calculated using the following equation:

$$\text{cocrt}_{\_sum} = (co_1 * crt_1) + (co_2 * crt_2) + \ldots (co_n * crt_n)$$

wherein
co=cooling load output (as a factor of the total possible cooling load output);
crt=the cooling run time of the co (over the run time period of the co);
n=the total number of cooling states in the (user defined) previous period; and
$\text{cocrt}_{\_sum}$=the sum of the products of the cooling load outputs (over the time period) and the corresponding cooling run times (over the time period).

To illustrate using example values, if in the previous period the cooling system 14 operated in cooling mode at 50% load output for a period of 30 minutes, and at 100% load output for a period of 180 minutes, then $$\text{cocrt}_{\_sum} = (co_1 * crt_1) + (co_2 * crt_2)$$

$\text{cocrt}_{\_sum}$=(0.5*30 minutes)+(1*180 minutes), which reduces to: $\text{cocrt}_{\_sum}$=(15 minutes)+(180 minutes), which is reduced to: $\text{cocrt}_{\_sum}$=195 minutes.

Determining the cooling potential includes determining the heating usage of the heating system 12 from the previous period, e.g., the previous day. More specifically determining the cooling potential includes adding the sum of the products of heating load output and operating time of the heating system 12 from the previous period, which may be calculated using the following equation:

$$\text{hohrt}_{\_sum} = (ho_1 * hrt_1) + (ho_2 * hrt_2) + \ldots (ho_n * hrt_n)$$

where
ho=heating load output (as a factor of the total possible heating load output);
hrt=heating run time of the ho (over the run time period of the ho, while ho is in a stable state);

n=the total number of heating states in the user defined time period being measured; and hohrt$_{sum}$=the sum of the products of the heating load outputs (over the time period) and the corresponding heating run times (over the time period).

To illustrate using example values, if in the previous period the heating system 12 operated in heating mode at 50% load output for a period of 30 minutes, and at 100% load output for 180 minutes, then hohrt$_{sum}$=($ho_1$*$hrt_1$)+($ho_2$*$hrt_2$);

hohrt$_{sum}$=(0.5*30 minutes)+(1*180 minutes);

hohrt$_{sum}$=(15 minutes)+(180 minutes); and hohrt$_{sum}$=195 minutes.

Figure 5:
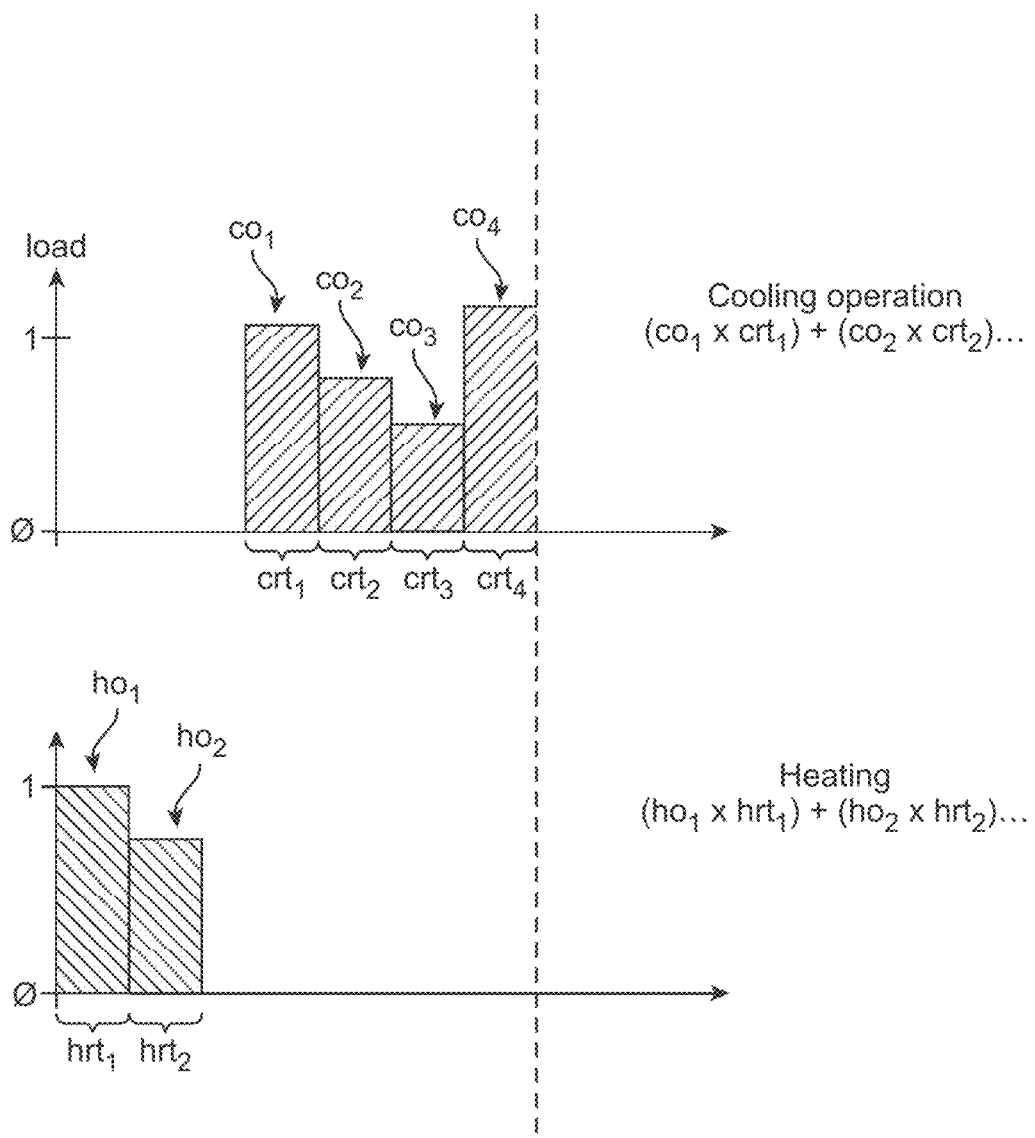
FIGS. 5 and 6 graphically illustrate exemplary occupied operational time ranges and load output for a cooling system and a heating system for calculation of a cooling potential of a building or other structure, in accordance with the present disclosure.

The cooling potential is calculated by subtracting the sum of the product of the heating load output and the run time (hohrt$_{sum}$) from the sum of the cooling load output and run time (cocrt$_{sum}$). Specifically, the controller 6 subtracts the hohrt$_{sum}$ from the cocrt$_{sum}$ to obtain the cooling potential (cp). For example, using the example values above:

If cp (cooling potential)=cocrt$_{sum}$−hohrt$_{sum}$; If the hohrt$_{sum}$=100 minutes; and If the cocrt$_{sum}$=150 minutes; then cp=cocrt$_{sum}$−hohrt$_{sum}$ cp=150 minutes−100 minutes; and cp=50 minutes FIGS. 5 and 6 graphically illustrate exemplary time ranges of exemplary operation of a cooling system and a heating system. FIG. 5 graphically shows a first sum of products of operational time and operational load of the cooling system and a second sum of products calculation for operational time and operational load of the heating system. The controller may difference the second sum of products from the first sum of products. A positive result indicates cooling potential, while a zero or negative result indicates no cooling potential.

Figure 6:
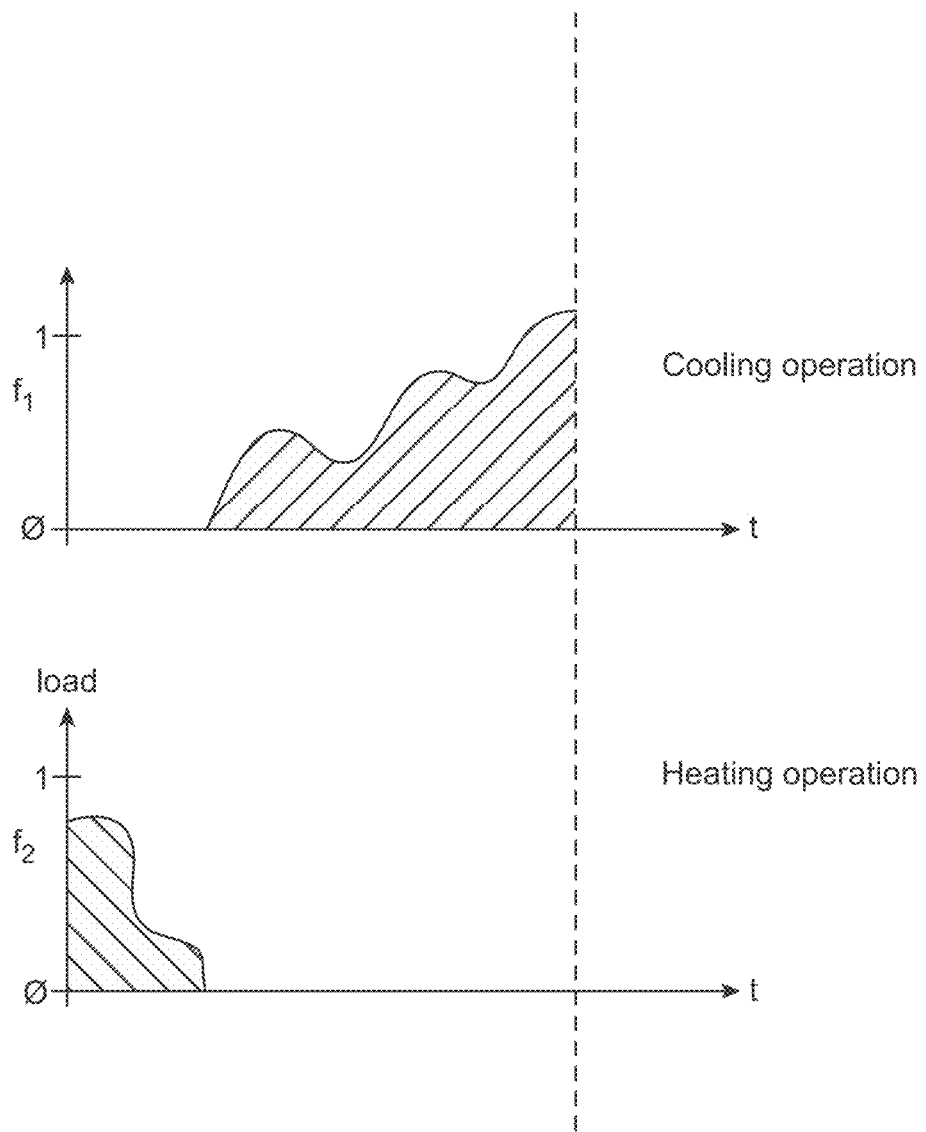

FIG. 6 shows an alternative to a sum of products calculation. For exemplary embodiments of cooling and heating equipment wherein cooling load output and heating load output are obtained as a function of operating load may be represented with respect to operating time. To determine a cooling potential the controller may execute a first integral calculation for an operational load of the cooling system as a function of operational time over the first time range, execute a second integral calculation for an operational load of the heating system as a function of operational time over the first time range and then difference the second integral from the first integral. Similar to above, a positive result indicates cooling potential, while a negative result indicates no cooling potential.

At step 108, the control scheme 100 subtracts a time bias quanta from the cooling potential (cp). The time bias may be defined or set by the user. This time bias is subtracted from the cooling potential value to inhibit use of the control scheme 100 when only slightly more cooling than heating was observed in the previous period. In such a situation, it is likely that having the equipment cool the structure in the early morning may actually cause the heating function to be energized prior to the "heat of the day," which may be around 3:00 pm. A user defined time bias may be adjusted or may be a default value, but as a default, that value may be set to 60 minutes.

For example, based upon the example values above:

entc=cp−time_bias wherein time_bias=time bias; and entc=enable control scheme 100 if positive value.

For example, if cp=50 minutes; and if time_bias is set to 60 minutes (which can be the default value); then entc=50 minutes−60 minutes; and entc=−10 minutes.

At step 110, the control scheme 100 determines whether the entc value is positive or negative. If the entc value is zero or negative, the control scheme 100 stops the process 100 until the next time period 130. In other words, if the entc value is zero or negative (after being biased by the user defined time bias), then conditions may, undesirably, cause the controller 6 to effectuate the heating system 12 during the upcoming period, before the heat of the day, if the control scheme 100 were to ventilate the air in the building. Accordingly, when the entc 110 value is negative, to avoid utilizing the heating system 12 after having cooled the structure, the control scheme 100 is not operated to utilize the exterior air damper 22, and/or fan 16 to intake outdoor air and/or the exhaust fan(s) 37 to exhaust interior air thereby avoiding cooling the structure undesirably and avoiding inefficient use of the heating system 12 during the upcoming time period.

At step 112, the control scheme 100 measures indoor and outdoor air conditions. At step 114, the control scheme 100 adjusts an exterior air temperature measurement using a user-defined or default temperature bias. Factoring in a temperature bias will cause the controller 6 to be less likely to determine that the exterior air is suitable to use for cooling the structure. The greater the temperature bias, the less likely the controller 6 will find the exterior air suitable. The temperature bias is added to compensate for electrical consumption of the equipment which operates during the control scheme 100 to cool the structure. For example, while running the fan(s) 16 alone consumes less electricity than running a number of the other HVAC components 8, e.g., compressors, condenser fans, etc., there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change. Enthalpy of the exterior air may be determined or estimated using exterior temperature and humidity measurements from the exterior temperature sensor 31 and the exterior humidity sensor 32 using known calculation techniques and/or modeling processes.

At step 116, subsequent to determining that the entc value is positive the control scheme 100 analyzes the exterior ambient air to determine whether the exterior air is suitable. The determination of whether the exterior air is suitable may be based upon the use of industry standard enthalpy calculations, or temperature calculations, or some combination of the two. Specifically, the interior air condition and exterior air condition is measured. The suitability may be based upon interior and exterior air temperature and, optionally, humidity values, provided by the sensors, such as interior temperature sensor 35, exterior temperature sensor 31, interior humidity sensor 36, and exterior humidity sensor 32, network values, etc., or may simply utilize interior and exterior air temperature sensors 35 and 31, respectively, network values, etc. If the controller 6 determines that the exterior air is not suitable for intake, then the control scheme is stopped at 130 and the controller 6 does not operate the damper(s) 22 and 23 and the fan 16 to intake exterior air, and optionally the exhaust fan(s) 37 to exhaust interior air.

At step 118, subsequent to determining that the exterior air is suitable for cooling (or economization), the controller 6 determines a night time cooling set point. The night time cooling set point is determined by subtracting the occupied heating set point, e.g., a "heating" set point on a conventional thermostat, from the occupied cooling set point, e.g., a "cooling" set point on a conventional thermostat, multiplying that value by a bias value (between 0 and 1, with a default of 0.67, for example), and then subtracting that product from the occupied cooling set point. The bias value may be used, for example, to affect the degree of pre-cooling within the building, with a larger biasing value resulting in more pre-cooling and a smaller biasing value resulting in less pre-cooling. For example, the following equation applies:

$$ntcsp = ocsp - (ocsp - ohsp) * udbv$$

wherein
ntcsp=night time cooling set point; ocsp=occupied cooling set point;
ohsp=occupied heating set point; and udbv=user defined bias value.

Example values are applied to this equation: If ocsp=70 F; If ohsp=65 F; and udbv=0.67; then ntcsp=ocsp-(ocsp-ohsp)*udbv; ntcsp=70 F-(70 F-65 F)*0.67; ntcsp=70 F-5 F*0.67; ntcsp=70 F-3.35 F; and ntcsp=66.65 F.

As explained below, with respect to FIG. 4 and control scheme 200, alternatively to utilizing only temperature values to determine the ntcsp, when humidity values are available, enthalpy values could be entered in place of temperature values to determine the ntcsp. In such a case, the value of the ntcsp could be expressed in terms of enthalpy rather than simple temperature. Likewise, alternatively to utilizing only temperature values to determine the result of step 120, when humidity values are available, indoor air enthalpy and outdoor air enthalpy could be used rather than simple temperatures.

At step 120 the control scheme 100 has determined the ntcsp, it compares the ntcsp with the interior air temperature. If the interior air temperature is less than or equal to the ntcsp, then the control scheme 100 terminates all sequences 130.

At step 122, if the interior air temperature is greater than the ntcsp, then the control scheme 100 energizes, for example, a relay, triac output, network signal, etc., which will, at least, energize equipment which causes cool outdoor air to enter the building, e.g., the fan 16, and open the exterior air damper 22 (also known as the fresh air damper 22). The control scheme 100 may energize any connected exhaust equipment such as the exhaust fan(s) 37, which may remove air from the building, to help facilitate economization of the primary heating, cooling, and ventilation equipment. The relay, triac output, network signal, etc. will remain active until conditions change in blocks 110, 116, or 120. In one embodiment, the controller will terminate step 122 if the controller 6 is transitioned to an occupied state. In one embodiment, the controller 6 will terminate step 122 if a current time is outside of the predefined time range.

At various points in the control scheme 100, the controller 6 may transition the one or more of the HVAC components 8 to a stopped operating state 130. The control scheme 100 may be configured to transition out of step 130 after a predefined duration of time or upon occurrence of an event.

Figure 4:
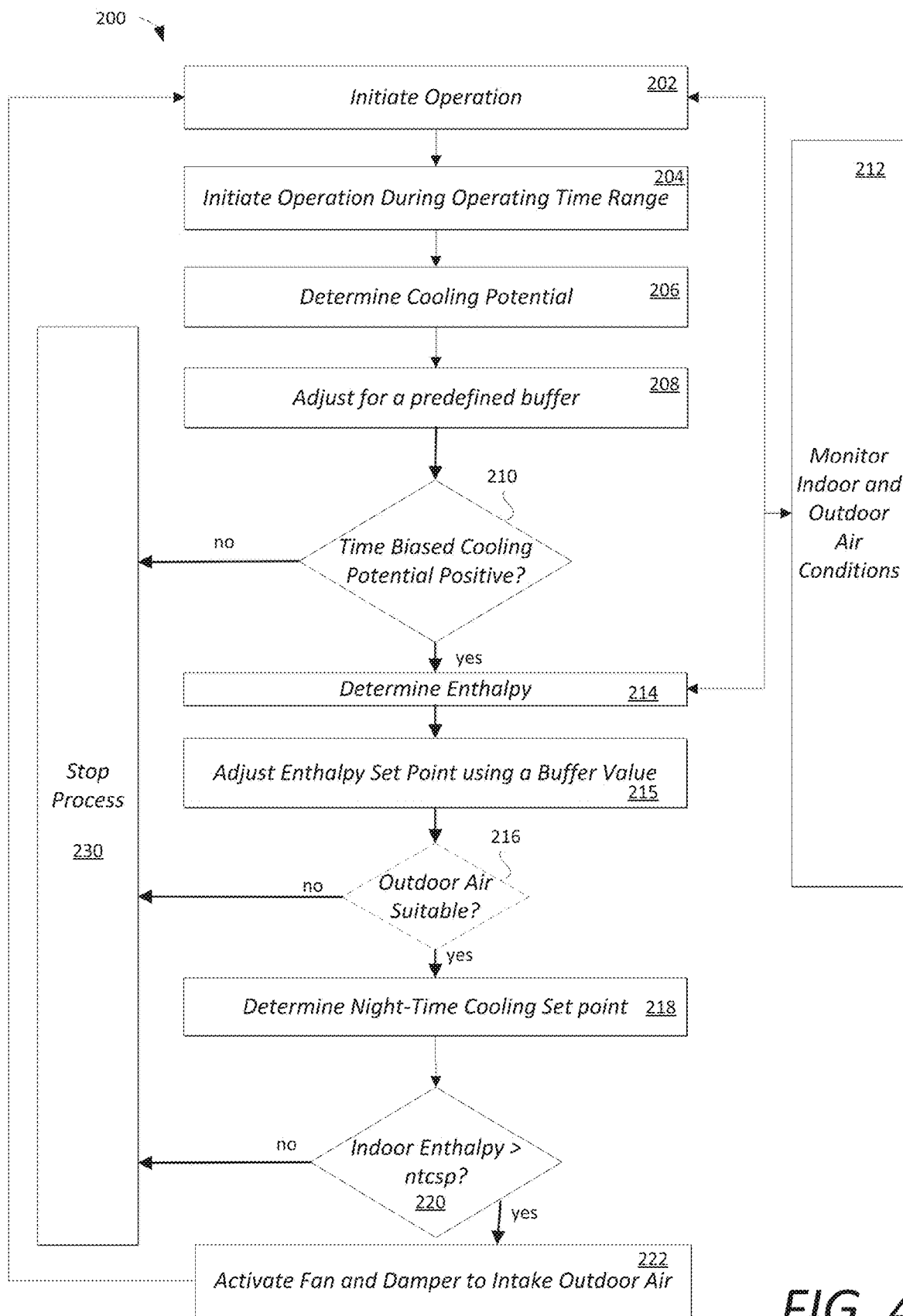
FIG. 4 is a control scheme for operating the exemplary HVAC system using enthalpy values, in accordance with the present disclosure.

FIG. 4 shows a control scheme 200 for operating the controller 6 and the HVAC components 8 illustrating operation of the system 10 using enthalpy values determined from temperature and humidity measurements. Although the control scheme 200 is shown as discrete elements, such an illustration is for ease of description and it should be recognized that the functions performed by the control scheme 200 may be combined in one or more devices, e.g., implemented in software, hardware, and/or application-specific integrated circuitry (ASIC) and executed, in some cases, concurrently or in parallel. For example, monitoring of the various sensors may be executed concurrent with any number of execution steps.

The control scheme 200 is directed at operating efficiencies that can be gained from utilizing exterior ambient conditions to ventilate outside air into the structure and/or condition the interior environment. For example, during warm summer months, the coldest part of the day is typically in the early morning, such as between 4:00 am and 6:00 am. As set forth further below, during this early morning time, the controller 6 instructs one or more of the HVAC components 8 to operate to effect the intake of cool exterior air (and either passively or actively exhaust warm interior air) based upon exterior air conditions, interior air conditions, the usage of the HVAC components 8 during the previous day, and current settings of the HVAC components 8. In other words, based upon these variables, the controller 6 may instruct the HVAC components 8 to intake cool exterior air, and optionally to exhaust warm interior air to decrease the temperature of the interior air of the structure to a temperature between the occupied heating set point and the occupied cooling set point of the HVAC components 8, as shown in FIG. 7.

To capitalize on preferential exterior ambient conditions and achieve greater operating efficiencies, the control scheme 200 is configured, in one exemplary implementation, to operate one or more of the HVAC components 8 using the controller 6 to condition the interior environment. As FIG. 4 shows, the control scheme 200 is initiated at step 202 whereby the controller 6 operates the HVAC components 8 based upon a user's predefined operating parameters, e.g., set points, and the results of a prior iteration of the control scheme 200. In the exemplary case of venting exterior air into an interior of the structure, the control scheme 200 operates during cool mornings at predefined or determined times to proactively ventilate the building with cool exterior air based upon the operation of the HVAC components 8 during a previous period, e.g., during the previous day.

At step 204, the controller 6 may execute the control scheme 200 during a predefined operating time range, a predefined time duration having a determined start time based upon prior measured exterior air conditions and/or photocell measurements.

At step 206, the control scheme 200 determines a cooling potential of the interior air based upon the previous period, e.g., the previous day, similar to step 106 described herein above with respect to control scheme 100.

At step 208, the control scheme 200 subtracts a time bias or buffer value from the determined cooling potential (cp). This time bias is subtracted from the cooling potential value to prohibit use of the control scheme 200 when only slightly more cooling than heating was observed in the previous period.

At step 210, the control scheme 200 determines whether the entc value is positive or negative or zero. The entc value is the difference between the cooling potential value and the time bias or buffer value. If the entc value is zero or negative, the control scheme 200 stops the process 200 until the next time period by transitioning the control scheme 200 to a stop state 230.

At step 212, the control scheme 200 measures interior and exterior air conditions including an exterior temperature and exterior humidity. At step 214, the control scheme 200 determines the exterior enthalpy using the monitored exterior air conditions including temperature and humidity. Enthalpy of the exterior air may be determined or estimated using exterior temperature and humidity measurements from the exterior temperature sensor 31 and the exterior humidity sensor 32 using known calculation techniques and/or modeling processes.

At step 215, the control scheme 200 adjusts the determined enthalpy value using a buffer value. Factoring in a buffer will cause the controller 6 to be less likely to determine that the exterior air is suitable to use for cooling the structure. The greater the buffer value, the less likely the controller 6 will find the exterior air suitable. The buffer value is added to compensate for electrical consumption of the equipment which operates during the control scheme 200 to cool the structure. For example, while running the fan(s) 16 alone consumes less electricity than running a number of the other HVAC components 8, e.g., compressors, condenser fans, etc. in combination with each other, there is still energy consumption used by simply running the fan 16. The "break even" point for venting the exterior air is not when the exterior air temperature or enthalpy is slightly less than that of the interior air temperature or enthalpy, respectively, but is when the interior air temperature or enthalpy is significantly greater than the exterior air temperature or enthalpy, respectively, so that the cost to utilize the intake of exterior air and the exhausting of indoor air (either passively or actively) for cooling is profitable, in terms of the cost per BTU of heat transfer (or electricity consumption per BTU of heat transfer). Based on factors including, but not limited to, indoor air humidity set points, fresh air intake considerations, specific equipment characteristics, and the local cost of electricity, the optimal temperature or enthalpy difference may change.

At step 216, subsequent to determining that the entc value is positive the control scheme 200 analyzes the exterior ambient air to determine whether the exterior air is suitable. The determination of whether the exterior air is suitable may be based upon the use of industry standard enthalpy calculations, or temperature calculations, or some combination of the two. In one embodiment, the interior humidity value and exterior humidity values are compared. If the controller 6 determines that the exterior air is not suitable for intake, e.g., interior conditions are preferable to exterior conditions, then the control scheme 200 is stopped at 230 and the controller 6 does not operate the damper(s) 22 and 23 and the fan 16 to intake exterior air, and optionally the exhaust fan(s) 37 to exhaust interior air.

At step 218, subsequent to determining that the exterior air is suitable for venting exterior air to the interior of the structure, the controller 6 determines a night time enthalpy cooling set point similarly to the process described herein above with respect to control scheme 100 only using enthalpy values and not exclusively temperature values. The night time cooling set point 218 is determined by subtracting the occupied enthalpy heating set point, from the occupied enthalpy cooling set point, and then multiplying that value by a bias value (between 0 and 1, with a default of 0.67, for example), and then subtracting that product from the occupied enthalpy cooling set point. For example, the following equation applies:

$$ntcsp = ocsp - (ocsp - ohsp) * udbv$$

wherein
ntcsp=night time cooling set point; ocsp=occupied enthalpy cooling set point;
ohsp=occupied enthalpy heating set point; and udbv=user defined bias value.

At step 220 the control scheme 200 has determined the ntcsp, it compares the ntcsp with the interior enthalpy. If the interior air enthalpy is less than the ntcsp, then the control scheme 200 terminates all sequences by transitioning to block 230.

At step 222, if the interior air enthalpy is greater than the ntcsp, then the control scheme 200 energizes, for example, a relay, triac output, network signal, etc., which will, at least, energize equipment which causes cool outdoor air to enter the building, e.g., the fan 16, and open the exterior air damper 22. The process may energize any connected exhaust equipment, which may remove air from the building, to help facilitate economization of the primary heating, cooling, and ventilation equipment. The relay, triac output, network signal, etc. will remain active until conditions change in blocks 210, 216, or 220. In one embodiment, the controller will terminate step 222 if the controller 6 is transitioned to an occupied state. In one embodiment, the controller 6 will terminate step 222 if a current time is outside of the predefined time range.

At various points in the control scheme 200, the controller 6 may transition the one or more of the HVAC components 8 to a stopped operating state 230. The control scheme 200 may be configured to transition out of step 230 after a predefined duration of time or upon occurrence of an event.

FIG. 7 graphically shows operation of the HVAC system for venting exterior air into a structure with respect to indoor temperature, while outdoor air is suitable for cooling 116. As FIG. 7 shows, specific condition ranges related to the structure's interior and monitored exterior temperature result in venting exterior air to the interior of the structure. In one embodiment, venting of the exterior air to the inside will occur when: (1) the time biased cooling potential is positive; and (2) the indoor temperature is greater than a cooling set point associated with an unoccupied status of the structure, i.e., (second time range). As illustrated in FIG. 7, the criteria for venting of the exterior air to the inside is satisfied in zone 300.

As set forth above, in one embodiment the controller 6 may utilize a thermostat of the HVAC components 8. For example, when the controller 6 utilizes a conventional thermostat of the HVAC components 8, the following is typical with most conventional thermostats: G terminal=fan 16 on; Y1 terminal=cooling first stage; Y2 terminal=cooling second stage; W1 terminal=heating first stage; W2 terminal=heating second stage.

A capacitor may be set to charge when the Y1 terminal is activated, with a resistor inline with the capacitor, which acts as a regulator for the current. The same capacitor could also be charged when the Y2 terminal is activated, which would also have an inline "regulator" resistor. Likewise, the heating terminals could also have a capacitor which is charged via the W1 and W2 terminals, with "regulating" resistors in-line. The charges of the two capacitors would be discharged via a short, which is regulated by a (high value) resistor. At the initiation time of the control scheme 100, e.g., 4:00 am, the total charges of each of the two capacitors could be compared via an integrated circuit (IC) to determine the cooling potential (as set forth above) for the upcoming time period. The time bias could be incorporated by adding a potentiometer to the circuit. When used in this configuration, some level of circuit integration could be added. For example, a time clock of the thermostat may be incorporated into the process. Similarly, the occupied set points (or at least the lowest cooling set point) may be incorporated into the process.

In one embodiment, interior humidity and exterior humidity sensors are optional, and a provision may be made to utilize both or only one type of humidity sensor. In one exemplary application using only an exterior humidity sensor, the system 10 utilizes a default, predefined humidity reading as a reference marker to compare measurements from the exterior humidity sensor. For example, the system 10 may be configured to assume that the interior humidity is at a first predefined level under a first set of criteria, e.g., a reading from the exterior humidity sensor after running the control scheme 100 for at least a first time period. Another example, may assume that the interior humidity is simply at a predefined level. During operation, the system 10 could compare the assumed humidity value and the measured value until the exterior humidity levels exceed 50% relative humidity, at which point the assumed interior humidity level would stay at 50%, while the actual relative humidity value for the exterior humidity levels would be reflected in the system's 10 calculations. In one embodiment, the control scheme 100 may stop if the exterior humidity is above and/or below a predetermined threshold.

On thermostat embodiments having a switch to select "cool" (only) or "heat" (only), there could be a calculated or user-defined ntcsp (see above). The calculated ntcsp could use a user defined temperature offset value which may be set via programming the thermostat, or may simply use a default value of a certain number of degrees less than the lowest cooling set point on the thermostat.

Figure 8A:
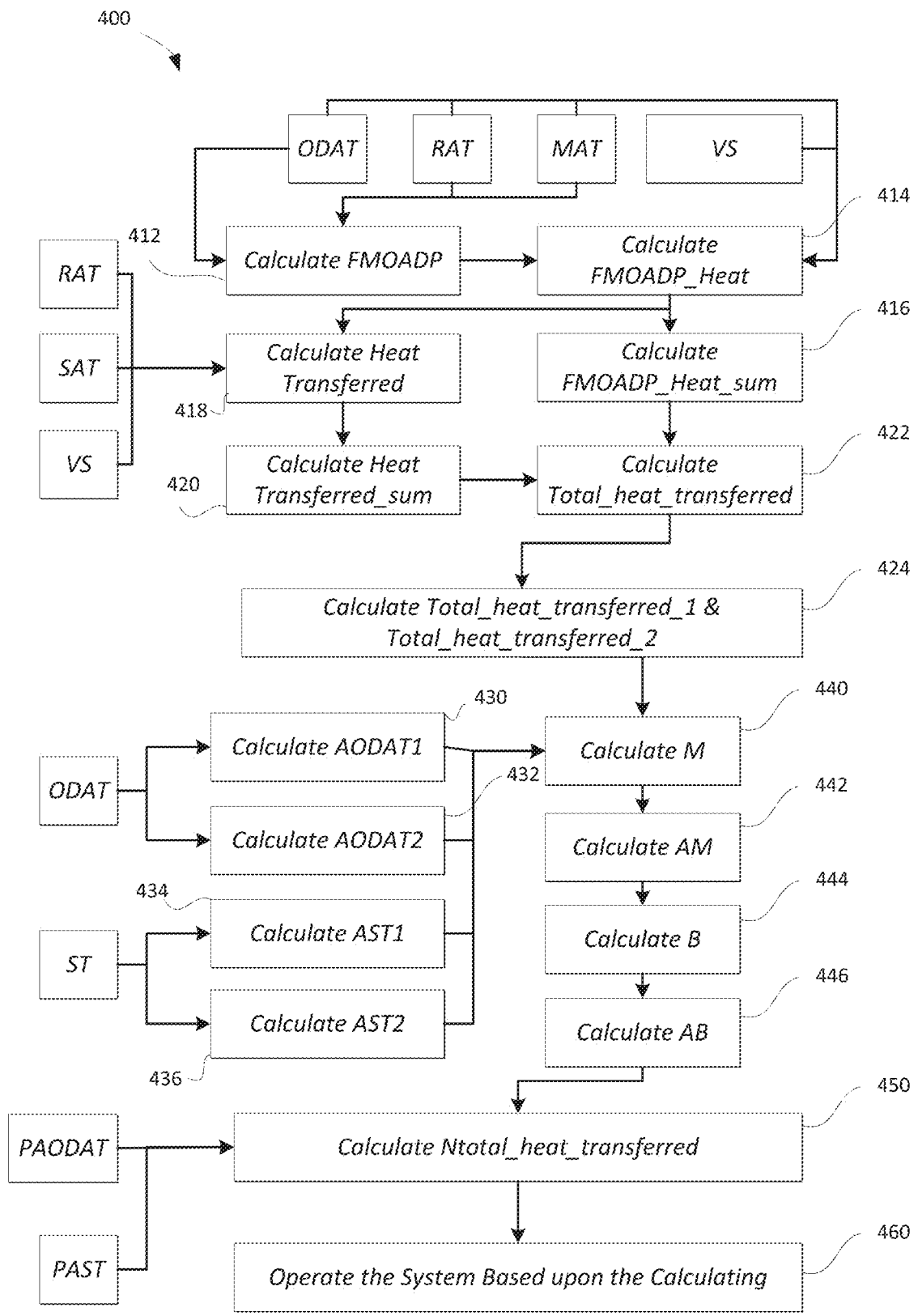
FIGS. 8A and 8B are control schemes for operating the temperature control system, in accordance with the present disclosure.

FIG. 8A shows a block diagram illustrating an exemplary process 400 for controlling the system 10 based upon a calculated anticipated heat energy transfer metric. Although FIG. 8A may show a specific order of method steps, the order of the steps may differ from what is depicted. Unless specifically stated, the methods or steps shown in the flowcharts and described in the accompanying text are not constrained to a particular order or sequence. In various embodiments, some of the steps thereof can occur or be performed concurrently or with partial concurrence and not all the steps have to be performed in a given implementation depending on the requirements of such implementation. Further, the order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure. All such variations are within the scope of the disclosure.

At step 412 of the process 400, operating of the system 10 may include determining a fixed or minimum outdoor air damper position (FMOADP) using any one of the following equations:

$$FMOADP=(RAT-MAT)/(RAT-ODAT)$$

$$FMOADP=(MAT-RAT)/(ODAT-RAT)$$

$$FMOADP=1-((ODAT-MAT)/(ODAT-RAT))$$

$$FMOADP=1-((MAT-ODAT)/(RAT-ODAT))$$

where
ODAT represents an outdoor air temperature which can be measured using sensor 31, and
RAT represents a return air temperature, which may be measured from sensor 33, and
MAT represents a mixed air temperature measured from sensor 39.

For example, if MAT=55° F., ODAT=50° F., and RAT=70° F., then FMOADP=(70° F.−55° F.)/(70° F.−50° F.), which equals a value of 0.75, meaning that the outdoor air damper 22 is open 75%, where a '1' value is defined as completely open and a '0' value is defined as closed.

In various embodiments, a discharge air temperature may be utilized to determine FMOADP instead of the MAT variable as one skilled in the art will recognize upon a careful reading of the teachings herein.

In various embodiments, the FMOADP could be calculated and trended (based on time or time in different states/values) for use later. For example, specific calculations of FMOADP at noon and at 2 pm, may be trended to determine position at 1 pm or 3 pm. In one embodiment, the FMOADP may be used in calculating the energy (or heat) added to, or removed from the structure via the "fresh air intake", or intake of outdoor air.

Additionally, heat transfer due to FMOADP and ventilation status (VS) may be calculated when considering temperatures. In various embodiments, depending on operating parameters of the system 10, historical heat transfer rates due to the intake of outdoor air may be used to predict the heat transfer going forward. For example, the heat transferred during the last same day of the previous week could be used to determine another day's anticipated value, or may begin as the average heat transferred the last same day of the week and month for the first year, and/or then in later years, the average heat transferred on the same day of the week and month in preceding years. In one exemplary application, a church might have nominal load demand on every day of the week except Sunday. Basing the next day's predicted cooling potential based on the last Sunday's actual load demand, or on the same Sunday from the previous year's load demand may be beneficial instead of using the prior day's load demand.

In one embodiment, if multiple systems with different maximum volumetric flow rates are used, then a "VS constant" can be multiplied by each individual climate control equipment's value for VS, such that the value of VS for each individual climate control equipment shall be in proportion to its volumetric flow rate in relation to all other climate control equipment. For example: If two pieces of climate control equipment are used, one capable of moving 4,000 CFM (unit #1), and another capable of moving 8,000 CFM (unit #2), then the VS constant for unit #1 would be 0.5, and the VS constant for unit #2 would be 1.

At step 414 of the process 400, a numeric value for the variable representing the heat transfer due to bringing outdoor air into and expelling indoor air out of a structure may be determined, iteratively at predetermined sampling intervals, e.g., at a time interval $t_i$, as follows, while understandably similar calculations could be made by replacing the temperature variables for enthalpy variables and modifying the equations slightly:

$$FMOADP\_heat=VS*(ODAT-RAT)*FMOADP$$

where
FMOADP_heat=the heat transfer metric due to bringing outdoor air into and expelling indoor air out of a structure,
ODAT represents an outdoor air temperature,
FMOADP represents a fixed or minimum outdoor air damper position,
RAT represents a return air temperature or exhaust air temperature, and
VS represents an operating status of the ventilation system 16 (e.g., 0=off, 1=on 100%, 0.5=50% output, etc.).

For example: If ODAT=60° F., FMOADP=0.1 (i.e., 10%), RAT=70° F., VS=1 (on), then FMOADP_heat=1*(60° F.−70° F.)*0.1, which reduces to −1° F.

At step 416, the system 10 may determine FMOADP_Heat_sum. FMOADP_Heat_sum represents a heat transferred (based on the FMOADP_heat metric), resulting from venting outdoor air into, and indoor air out of, the building structure for the entire period being measured (e.g., a whole day, 22 hours, one week, etc.). In exemplary applications having multiple climate control equipment (i.e. air conditioners, exhaust fans, etc.) within a building structure or zone, the FMOADP_Heat_sum can be summed with the FMOADP_Heat_sum of the other networked and/or controlled systems, however, the FMOADP_heat calculation of each individual unit would likely need to have a "VS constant" (as described above) applied to the FMOADP_heat value for each individual unit. FMOADP_Heat_sum could be calculated as follows:

$$\text{FMOADP\_Heat\_sum} \cong \Sigma_{i=1}^{z} x_i t_i$$

where
x represents FMOADP_heat,
$t_i$ represents a predetermined time interval,
FMOADP_heat represents the heat transfer metric (as defined above) due to bringing outdoor air into and expelling indoor air out of a structure,
i represents an interval,
z represents a number of preset timed intervals during the period (the period usually being 22 or 24 hours, but could be 6 hours, etc.) wherein each measure of FMOADP_heat is taken.

Similarly, FMOADP_Heat_sum may be calculated using an integral calculation:

$$\text{FMOADP\_Heat\_sum} = \int_a^b \text{FMOADP\_heat}(t) dt$$

where
a=the beginning of the time period,
b=the end of the time period, and
t=time.

At step 418 of the process 400, the system 10 may calculate a heat transfer metric (HeatTransferred) due to a HVAC unit's operation of mechanical heating or cooling (e.g. using gas burners, refrigerant based systems, etc.), iteratively at predetermined sampling intervals, e.g., at a time interval $t_i$, as follows, while understandably similar calculations could be made by replacing the temperature variables for enthalpy variables and modifying the equations slightly. The operation of the mechanical cooling or mechanical heating is preferably considered to ascertain the heat transfer into or out of a structure during a period of time. In a situation where the volumetric air flow (in cubic feet per minute (CFM)) is known, the energy transferred may be fairly easily calculated, however, in a situation where the CFM is unknown, and for the purposes of the disclosure, the total heat transfer, as a result of a HVAC unit's mechanical operation, (e.g., use of gas burners for heating, refrigeration based cooling systems, compressors, etc.) may require the formation of a new metric.

The variable 'HeatTransferred' represents a heat transfer metric, due to a HVAC units operation of mechanical heating and/or cooling, but not including the heat energy transferred due to bringing outdoor air into, and expelling indoor air out of a structure, and may be determined by:

$$\text{HeatTransferred} = VS*(SAT-RAT) - \text{FMOADP\_heat}$$

where
SAT represents a temperature of the supply air from sensor 38,
RAT represents a temperature of the return air which may be obtained from sensor 33, and
FMOADP_heat=the heat transfer metric (as defined above) due to bringing outdoor air into, and expelling indoor air out of a structure.

For example, if SAT=100° F., RAT=70° F., VS=1 (on), and FMOADP_heat=−1° F., then: HeatTransferred=1*(100° F.−70° F.)−(−1° F.) which reduces to HeatTransferred=31° F.

Figure 8B:
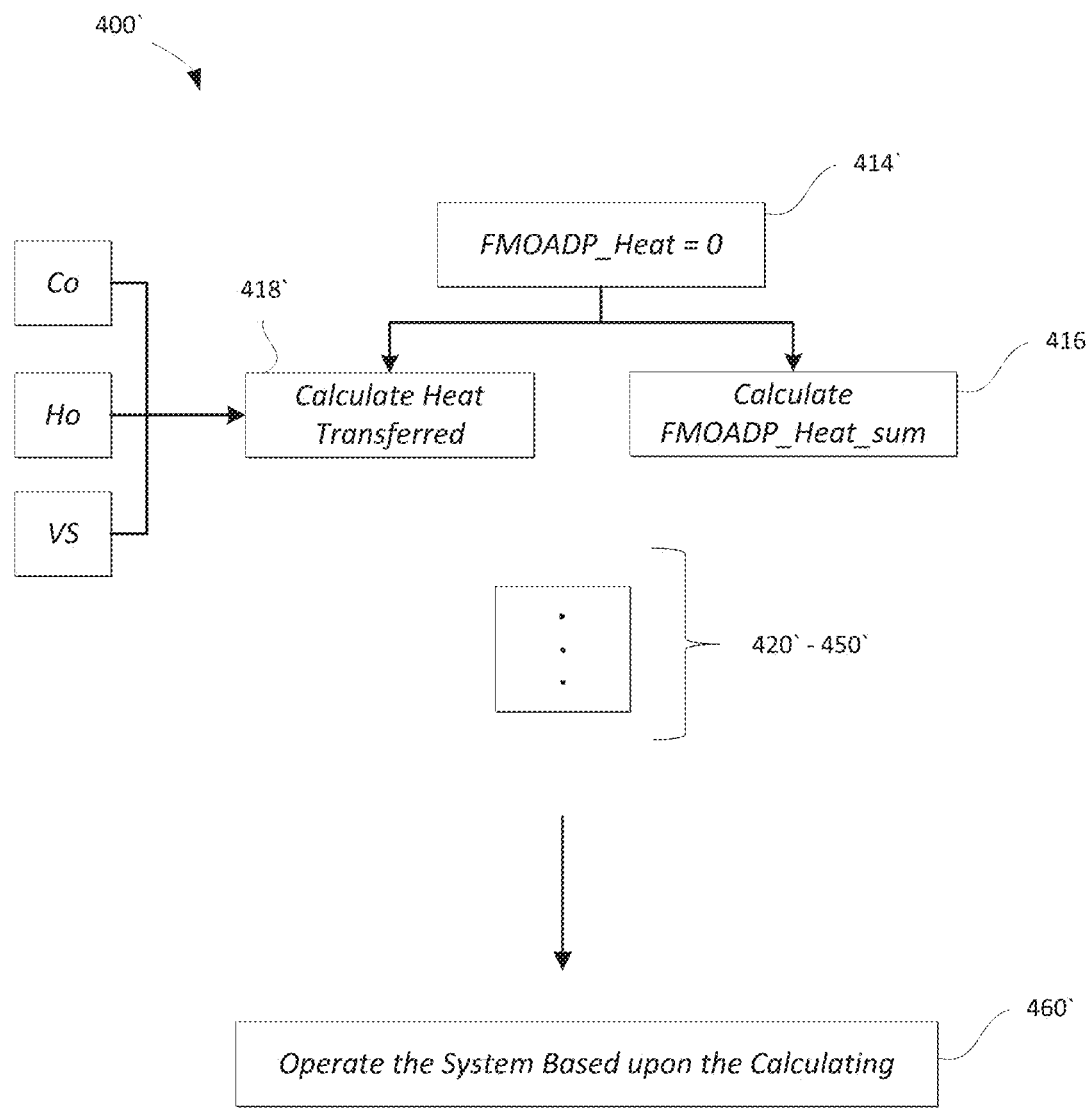

FIG. 8B shows an alternative process 400' for implementation in the system 10 without sensors 31, 33, 38, and 39 being used for calculating HeadTransferred at step 418'. In one embodiment, HeatTransferred may be calculated as follows: HeatTransferred=VS*(Ho−Co), wherein FMODAP_heat is equal to zero (step 414'); and Ho represents heating load output and Co represents cooling load output as described hereinabove with reference to FIG. 3. FMOADP_Heat_sum is then calculated at step 416' based upon a FMOADP_heat having a 0 value. As one skilled in the art may understand after considering the teachings disclosed herein that the units of measurement will change from degree-minutes to minutes. Such embodiments using this alternative calculation for HeatTransferred shall also affect the processes, equations, and conclusions given in some parts this disclosure, however, it should be noted that alternative calculations for HeatTransferred and/or Total_heat_tansferred (described below) to operate the system 10 at step 460', when used in conjunction with the teachings herein disclosed, could effectively be used as understood by those skilled in the art upon a careful reading of the teachings herein.

Step 420 of the process 400 may include determining the heat transferred due to the mechanical operations, e.g., gas burners, refrigeration circuits, etc., but excluding the heat energy transferred due to introducing outdoor air into, and expelling indoor air out of the structure. This value may be calculated for a predefined period (i.e. a whole day, 22 hours, a week, etc.), wherein the calculation is computed once per interval, and then summed, which may then be represented by the variable: HeatTransferred_sum, which may then be calculated by:

$$\text{HeatTransferred\_sum} \cong \Sigma_{i=1}^{z} x_i t_i$$

where
i represents an interval or iteration,
$t_i$ represents a predetermined time interval
x represents HeatTransferred, and
z represents a number of preset timed intervals during the period (the period usually being 22 or 24 hours, but could be 6 hours, etc.) wherein each measure of HeatTransferred is taken.

Alternatively, the HeatTransferred_sum could be calculated by:

$$\text{HeatTransferred\_sum} = \int_a^b \text{HeatTransferred}(t) dt$$

where
- a=the beginning of the time period,
- b=the end of the time period, and
- t=time In one embodiment, of a structure having a plurality of networked systems, a separate HeatTransferred_sum may be determined for each system and then may be added together.

Subsequent to calculating the HeatTransferred_sum, the process 400 calculates a Total_heat_transferred (at step 422) by adding HeatTransferred_sum with FMOADP_Heat_sum. Total_heat_transfered then represents a total ° F.-minutes of heat transferred into the structure by the HVAC unit during the time period (i.e. 22 hours, 24 hours, one week, etc.). For example: if HeatTransferred_sum=500° F.-minutes, FMOADP_Heat_sum=−400° F.-minutes, then Total_heat_transfered=500° F.-minutes+(−400° F.-minutes)=100° F.-minutes.

In the above example, the heat energy was transferred into the structure (the heating system 12 was operated to introduce heat into the structure). If the value would have been negative, then heat energy would have been transferred out of the structure by the system 10 via one or more of the components, e.g., the ventilation system 16.

Once the total_heat_transferred has been determined, it can be used to determine the slope M 440, which in turn can be used to predict the next period's heat transfer (NTotal_heat_transferred 450). To determine M, the total_heat_transferred for at least two historic time periods can be calculated (i.e. two days, two 6 hour periods, two weeks, or whatever period is determined to be most effective in predicting the next period's heat transfer desired). The total_heat_transferred for the first historic time period could be total_heat_transferred_1, and for the second historic time period could be called total_heat_transferred_2, and so on, as determined in step 424.

If the volumetric flow rate of the air, based on VS is known, then one skilled in the art may calculate the heat transfer in British Thermal Units (BTU) of HeatTransferred, FMOADP_Heat_sum, and Total_heat_transferred. Integrating the calculations into the system to provide for automated calculations of HeatTransferred_sum versus FMOADP_Heat_sum would prove beneficial in terms of analyzing deficiencies in equipment configurations/damper settings (i.e. if a structure was drawing in excessive amounts of outdoor air, etc.).

The process 400 further includes determining an average outdoor air temperature for a period (AODAT) at steps 430 and 432.

AODAT could be calculated by:

$$\text{AODAT} \cong (\Sigma_{i=1}^{z} x_i)/z$$

where
- AODAT represents an average outdoor air temperature for a period,
- z represents a number of preset timed intervals during the period (the period is usually 22 or 24 hours, but could be 6 hours, etc.),
- x represents an outdoor air temperature, and
- i represents a predetermined time interval Alternatively, AODAT may be calculated by:

$$\text{AODAT} = (\int_a^b f(x)dx)/(b-a)$$

where
- f(x) represents a function of AODAT measurements over the time period a to b,
- a represents a beginning of the time period, and
- b represents an end of the time period.

At steps 434 and 436 of the process 400, iterations of the average space temperature inside the structure, e.g., AST1, AST2, etc., may be calculated by:

$$\text{AST} \cong (\Sigma_{i=1}^{z} x_i)/z$$

where
- AST represents the average space temperature for a period,
- z represents a number of preset timed intervals during the period (the period usually being 22 or 24 hours, but could be 6 hours, etc.) wherein each measure of the space temperature set point is taken,
- x represents ST, which is a space temperature measurement made by sensor 35, and
- i represents a predetermined time interval.

Alternatively, the AST could be calculated by:

$$\text{AST} = (\int_a^b f(x)dx)/(b-a)$$

where
- AST represents an average space temperature for a period,
- f(x) represents a function of AST measurements over the time period a to b,
- a represents a beginning of the time period,
- b represents an end of the time period, and
- x represents ST, which is a space temperature measurement made by sensor 35.

Considering that it's reasonable to assume that a structure or zone with no internal heat sources, e.g., lights, people, computers, etc., that has zero influence from radiant heat, e.g., from the sun, that is not affected by the differential temperatures of materials inside or of the building structure, e.g. the concrete floor, etc., that there is no differential temperature between the inside of the structure and the earth, and assuming (for purposes of the process 400), that the HVAC equipment, e.g., the exhaust fans 37 and the supply air fans 16, do not add heat energy to the structure, it's reasonable to assume that the structure's Total_heat_transferred≅0, if the ASTSP=AODAT=AST, where ASTSP represents the average space temperature set point for a period, AODAT represents the average outdoor air temperature for a period, and AST represents the average space temperature for a period.

Because outdoor air temperatures vary during the course of a period it is beneficial to sample certain variables and values throughout the day. As indicated herein above, Total_heat_transferred=HeatTransferred_sum+FMOADP_Heat_sum. As expressed herein above, a 22 hour, 24 hour, period may be used to define a "day" or "period", however it should be understood that when determining a slope of a graph, it may be beneficial to use different time periods. For example: While it is understood that HeatTransferred_sum and FMOADP_Heat_sum can use identical time periods for determining Total_heat_transfered, and any equations that combine HeatTransferred_sum, FMOADP_Heat_sum, Total_heat_transferred, AODAT, and AST will likely require that identical time periods be used, it should also be understood that in the application of determining the slope $((\text{AODAT}_2 - \text{AST}_2) - (\text{AODAT}_1 - \text{AST}_1))/(\text{Total\_heat\_transferred}_2 - \text{Total\_heat\_transferred}_1)$ that smaller time periods may be more suitable, e.g., a 6 hour time period, although the disclosure herein contemplates that various time periods may be utilized consistent with the teachings herein.

Subsequent to determining AODAT and AST, the process 400 calculates a slope 'M' based upon two or more iterations of AODAT, AST, and the Total_heat_transferred calculations at step 440.

The slope 'M' is the slope of the graph relating Total_heat_transferred to (AODAT−AST), and may be calculated by:

$$M=((AODAT_2-AST_2)-(AODAT_1-AST_1))/(Total\_heat\_transferred_2-Total\_heat\_transferred_1)$$

where
$AST_1$ represents an average space temperature for the 1st period,
$AST_2$ represents an average space temperature for the 2nd period,
$AODAT_1$ represents an average outdoor air temperature for the 1st period,
$AODAT_2$ represents an average outdoor air temperature for the 2nd period, and
Total_heat_transferred$_1$ and Total_heat_transferred$_2$ being defined hereinabove and having been calculated in step 424.

At step 442 of the process 400, the system 10 may apply various statistical conditioning or averaging of the slope M to maintain consistency. Because the slope of the graph relates Total_heat_transferred to (AODAT−AST) it should remain fairly constant, since the slope is directly related to the R-value of the structure's envelope (as well as other minor factors—in some cases). In one embodiment, a time period of one week may be used to maintain consistency/accuracy by averaging M over that time period. M could be averaged by:

$$AM \cong (\Sigma_{i=1}^{z} x_i)/z$$

where
AM represents an average of M over time,
x represents M, as defined above,
z represents a number of preset periods during the time span in which M is averaged (the time span in which M is averaged could be one week, two weeks, etc.), and
i represents a predetermined interval where each M is calculated.

Under this summation equation, the difference between the beginning of the time span and the end of the time span may be defined as a week (i.e., 7 days), while M, could be recalculated every six hours, or once a day, for example. As noted above, if slope M is to be calculated every six hours, then the subsequent periods within the calculations for AODAT, AST, and Total_heat_transferred would preferentially use six-hour time periods, where appropriate. AM may be calculated using the following equation:

$$AM = (\int_a^b f(x)dx)/(b-a)$$

where
Where f(x) represents a function of m slope calculations over the time span a to b,
a represents a beginning of the time span, and
b represents an end of the time span.

Figure 9:
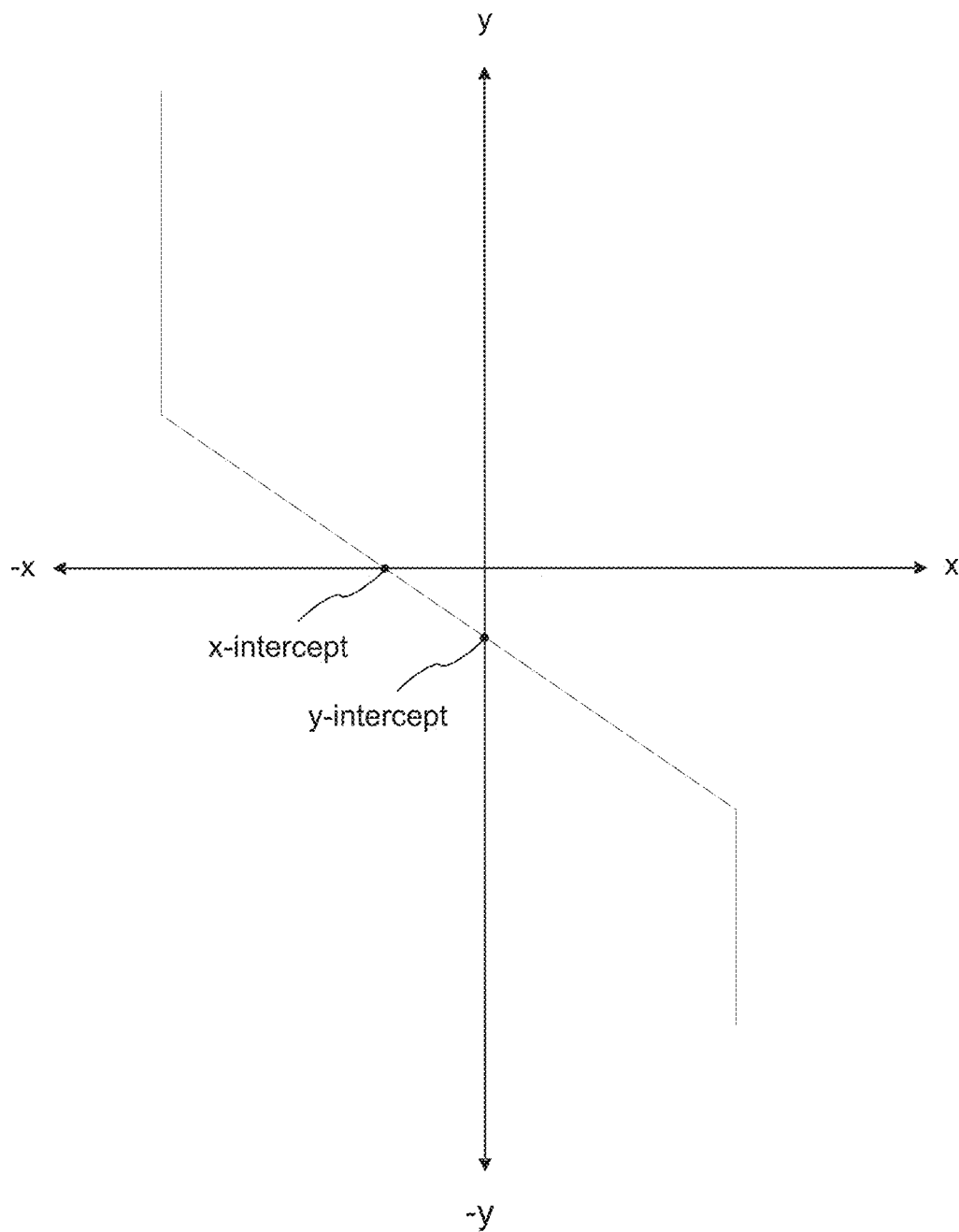
FIG. 9 graphically illustrates a heat transfer metric with respect to temperature, in accordance with the present disclosure.

With reference to FIG. 9, B is a y-intercept used on FIG. 9 that illustrates a relationship of Total_heat_transferred to (AODAT−AST). At step 444 of process 400, B may be calculated for a time period, i, by the equation:

$$B=(AODAT_i-AST_i)-(Total\_heat\_transferred_i * M_i)$$

where
AODAT represents average outdoor air temperature, as defined previously,
AST represents average space temperature, as defined previously,
i represents a predetermined interval where each B is calculated, and
M represents a slope of the graph comparing Total_heat_transferred to (AODAT−AST).

Similar to calculating AM, an average B could be calculated over a time span. Average B, represented as AB, may be calculated in step 446 of the process 400 using:

$$AB \cong (\Sigma_{i=1}^{z} x_i)/z$$

where
AB represents an average of B over time,
x represents B, as defined above,
z represents a number of preset periods during the time span in which B is averaged (the time span in which B is averaged could be one week, two weeks, etc.), and
i represents a predetermined interval where each B is calculated.

In one embodiment, AB could be calculated by one or more variations of:

$$AB = (\int_a^b f(x)dx)/(b-a)$$

where
f(x) represents a function of y-intercept (B) calculations over a time span a to b,
a represents a beginning of the time span, and
b represents an end of the time span.

Subsequent to determining the AM slope and AB (the average y-intercept of FIG. 9), the process continues to step 450 wherein a NTotal_heat_transferred value is determined. In various embodiments, weather predictions may be utilized in conjunction with the AM slope to determine the next period's (e.g., day), anticipated/projected Total_heat_transferred, i.e., NTotal_heat_transferred. In some embodiments, the AM slope permits incorporating set point data into the equation for determining the next day's anticipated/projected Total_heat_transferred. For example: a church may not have need for cooling any day except Sunday. Such as this is the case, it's likely that the parishioners would set the thermostat to a very high temperature set point for all days except for Sunday. Assuming that the space temperature will need to reach the space temperature set point, we can use the slope to determine the NTotal_heat_transferred.

A predicted space temperature may be determined by taking all relevant data regarding scheduled set point information (which correlates space temperature set points with times), default space temperature set points, historical user set point data, etc. Although the usual day/night temperature swing which occurs will lead to many embodiments simply having a daily time period, one skilled in the art may envision an embodiment configured, such that energy may be stored, in a region of the world like Antarctica, wherein the period may be generally extended for the entire warm season, which would be the summer. Such as the normal one-day embodiment will be the case, the calculation of ASTSP, is provided as an exemplary embodiment for an exemplary application, normally being about one day, however it should be understood by those skilled in the art that the one day examples given herein are not intended to limit the scope of the disclosure. ASTSP, generally, may include the average space temperature set points for the next period and may be calculated by:

$$ASTSP \cong (\Sigma_{i=1}^{z} x_i)/z$$

where
ASTSP represents an average space temperature set point for a period,
z represents a number of preset timed intervals during the period (usually 22 or 24 hours, but could be 6 hours, etc.) wherein each measure of the space temperature set point is taken, x represents the space temperature set point, and
i represents a predetermined time interval.

Alternatively, the ASTSP could be calculated by:

$$ASTSP = (\int_a^b f(x)dx)/(b-a)$$

where f(x) is a function of space temperature set points from a to b, a represents a beginning of the time period, b represents an end of the time period.

PAODAT is the predicted average outdoor air temperature. In one embodiment, this value may be determined from an average of the predicted outdoor air temperatures (PODAT) over a future time period. In one embodiment, PAODAT may be based upon forecasted predictions from subscription or governmental sources, e.g., weather forecasting information. In one embodiment, PAODAT may simply be based upon a rolling average temperature period over a predefined number of time periods, e.g., days. As there are many ways to determine PAODAT, which one skilled in the art will recognize upon a careful reading of the disclosure herein may understand there are many ways to determine PAODAT.

PAST is the predicted average space temperature for the following time period (i.e. the next day or next 12 hours, etc.). There are many ways to calculate PAST. In one embodiment of the invention, PAST may be equal to the AST of a chosen historical time period, such as the day before, or the same day of the previous week. The limitation of setting PAST equal to a previous time period's AST is that this method does not take into account the future set point temperature schedule.

In one embodiment, PAST is a function of predicted outdoor air temperature (PODAT) and the future set point temperature. Using historical data, the space temperature could be plotted versus the outdoor air temperature under different set point temperature conditions. From this data, functions to represent ST versus ODAT, under different set point conditions, could be determined. Any data that derives a non-functional result would be negated or accounted for differently. Next, the PODAT could be substituted for the ODAT in the functions. In one embodiment, PAST can be calculated as follows:

$$PAST = \left(\frac{1}{T1 + T2 + \ldots + Tn}\right)$$
$$\left(T1 * \frac{\int_{a1}^{b1}(f(x))1 dx}{b1-a1} + T2 * \frac{\int_{a1}^{b1}(f(x))2 dx}{b2-a2} + \ldots + Tn * \frac{\int_{an}^{bn}(f(x))n dx}{bn-an}\right)$$

where x represents a predicted outdoor air temperature (POADT), (f(x))1, (f(x))2 . . . (f(x))n represent a function of space temperature based on POADT, wherein the function may be different for every set point temperature, T1, T2 . . . Tn represent time intervals in which the set point temperature remains a constant (i.e. for the first 4 hours (T1=4) of the day the set point is at 70° F., for the next 6 hours (T2=6) the set point is 72° F., etc.), n represents a total number of set point intervals for the time period (i.e. day, 12 hours, etc.), b1, b2, bn represent an ending POADT of the interval, and a1, a2, an represent a beginning POADT of the interval.

In one embodiment, PAST may be calculated based upon Newton's

"Law of Cooling (Warming)." Newton's "Law of Cooling" states that the rate at which the temperature changes of one body is proportional to the difference in the temperatures of the body and the environment. In this application, the environment includes the outside as well as the effects of internal heat sources, such as computers, lights, etc. The differential equation for Newton's "Law of Cooling" is as follows:

$$\frac{d(ST)}{dt} = k(ODAT1 - ST)$$

Accounting for internal heat sources:

$$\frac{d(ST)}{dt} = k(YODAT1 - ST)$$

where $$\frac{d(ST)}{dt}$$

represents a rate of change of temperature with respect to time, k represents a proportionality constant, t represents time, YODAT1 represents the outdoor air temperature minus the value of the above B or AB at the start of the time interval, and ST represents a space temperature at any time t.

We will begin by assuming that the building is warming up and YODAT1>ST1. This differential equation is solved by separating the variables:

$$\frac{d(ST)}{(YODAT1 - ST)} = kdt$$

and then integrating $$\int \frac{d(ST)}{(YODAT1 - ST)} = \int kdt$$

$$\ln|YODAT1 - ST| = kt + c$$

where c represents a constant obtained in any antiderivative.

Solve for ST via exponentials on both sides of the equation:

$$YODAT1 - ST = e^{kt+c}$$

$$YODAT1 - ST = (e^{kt})(e^c)$$

Since c is a constant, $e^c$ is also a constant, hereinafter referred to as: C and the equation becomes:

$$YODAT1 - ST = Ce^{kt}.$$

By solving for ST, the equation may be represented as:

$$ST = YODAT1 - Ce^{kt}.$$

In predicting how the structure responds to temperature changes, both k and C can be determined. Two data points are used to determine how the structure naturally warms. Using historical data (t1, ST1) and (t2, ST2) where the numbers 1 and 2 indicate first and second data points while YODAT1 remains constant.

These data points are inserted into the solved differential equation to obtain two equations with the same two unknowns, k and C.

$$ST1 = YODAT1 - Ce^{k(t1)}$$

$$ST2 = YODAT1 - Ce^{k(t2)}$$

To simply solve for k and C, we can assume that t1=0.

$$ST1 = YODAT1 - Ce^{k(0)}$$

$$ST1 = YODAT1 - C$$

$$C = YODAT1 - ST1$$

and C is simply the difference in the initial indoor and outdoor temperatures minus the value of B or AB.

Substituting this value of C into the same equation with the second data point, we can solve for k.

$$ST2 = YODAT1 - (YODAT1 - ST1)e^{k(t2)}$$

$$\frac{ST2 - YODAT1}{-(YODAT1 - ST1)} = e^{k(t2)}$$

$$\ln\left(\frac{ST2 - YODAT1}{-(YODAT1 - ST1)}\right) = k(t2)$$

$$k = \frac{\ln\left(\frac{ST2 - YODAT1}{-(YODAT1 - ST1)}\right)}{(t2)}$$

If t1≠0, then we can transform the equations removing the exponentials to solve for k and C. First, substitute the two data points to obtain two equations.

$$YODAT1 - ST1 = Ce^{k(t1)}$$

$$YODAT1 - ST2 = Ce^{k(t2)}$$

We now take the natural logarithm of both sides.

$$\ln(YODAT1 - ST1) = \ln(Ce^{k(t1)})$$

$$\ln(YODAT1 - ST1) = \ln(C) + \ln(e^{k(t1)})$$

$$\ln(YODAT1 - ST1) = \ln(C) + k(t1)$$

We use the same process with the second equation to obtain:

$$\ln(YODAT1 - ST2) = \ln(C) + k(t2).$$

Using the method of elimination, we first solve for k. One equation is subtracted from the other and the common term ln(C) is eliminated yielding:

$$\ln(YODAT1 - ST2) - \ln(YODAT1 - ST1) = k(t2) - k(t1)$$

$$\ln(YODAT1 - ST2) - \ln(YODAT1 - ST1) = k(t2 - t1)$$

$$k = \frac{\ln(YODAT1 - ST2) - \ln(YODAT1 - ST1)}{(t2 - t1)}$$

$$k = \frac{\ln\left(\frac{YODAT1 - ST2}{YODAT1 - ST1}\right)}{(t2 - t1)}$$

Knowing the value of k, we can substitute this value and solve for C:

$$\ln(YODAT1 - ST1) = \ln(C) + kt_1$$

$$\ln(YODAT1 - ST1) = \ln(C) + \frac{\ln(YODAT1 - ST2) - \ln(YODAT1 - ST1)}{(t2 - t1)}(t1)$$

$$\ln(C) = \ln(YODAT1 - ST1) - \frac{\ln(YODAT1 - ST2) - \ln(YODAT1 - ST1)}{(t2 - t1)}(t1)$$

$$C = e^{\left[\ln(YODAT1-ST1)\frac{\ln(YODAT1-ST2)-\ln(YODAT1-ST1)}{(t2-t1)}(t1)\right]}$$

$$C = e^{\left[\ln(YODAT1-ST1)\frac{\ln\left(\frac{YODAT1-ST2}{YODAT1-ST1}\right)}{(t2-t1)}(t1)\right]}$$

The value of k is a value dependent on the thermal characteristics of the structure. The value C would be calculated with different values of YODAT1 and ST1.

When the outside temperature minus the above B or AB is less than the inside temperature (YODAT2<ST1, where YODAT2 is the outdoor air temperature minus either B or AB, the structure will naturally cool. Again, we start with Newton's "Law of Cooling":

$$\frac{d(ST)}{dt} = k(ST - YODAT2).$$

where

YODAT2 represents the outdoor air temperature minus the value of above B or

AB at the start of the time interval.

Separate the variables and integrate as before:

$$\int \frac{d(ST)}{ST - YODAT2} = \int k\,dt$$

$$\ln|ST - YODAT2| = kt + c$$

$$ST - YODAT2 = e^{kt+c}$$

$$ST - YODAT2 = Ce^{kt}$$

$$ST = Ce^{kt} + YODAT2$$

Two data points are used to determine how the structure naturally cools. Using historical data (t1, ST1) and (t2, ST2) where the numbers 1 and 2 are the labels for the first and second data points while YODAT2 remains constant. These data points are inserted into the above solved differential equation to obtain two equations with the same two unknowns, k and C.

$$ST1 = Ce^{k(t1)} + YODAT2$$

$$ST2 = Ce^{k(t2)} + YODAT2$$

To simply solve for k and C, we can assume that t1=0.

$$ST1 = Ce^{k(t1)} + YODAT2$$

$$ST1 = C + YODAT2$$

$$C = ST1 - YODAT2$$

Where C is the difference in the initial indoor and outdoor temperatures minus the y-intercept (B or AB—as defined herein above) of FIG. 9 for the start of the period of structural cooling.

Substituting this value of C into the same equation with the second data point, we can solve for k.

$$ST2 = (ST1 - YODAT2)e^{k(t2)} + YODAT2$$

$$\frac{ST2 - YODAT2}{ST1 - YODAT2} = e^{k(t2)}$$

$$\ln\left(\frac{ST2 - YODAT2}{ST1 - YODAT2}\right) = k(t2)$$

$$k = \frac{\ln\left(\frac{ST2 - YODAT2}{ST1 - YODAT2}\right)}{(t2)}$$

If t1≠0, then we can transform the equations removing the exponentials to solve for k and C as before.

$$ST1 - YODAT2 = Ce^{k(t1)}$$

$$ST2 - YODAT2 = Ce^{k(t2)}$$

We may now take the natural logarithm of both sides.

$$\ln(ST1 - YODAT2) = \ln(Ce^{k(t1)})$$

$$\ln(ST1 - YODAT2) = \ln(C) + \ln(e^{k(t1)})$$

$$\ln(ST1 - YODAT2) = \ln(C) + k(t1)$$

We use the same process with the second equation to obtain $$\ln(ST2 - YODAT2) = \ln(C) + k(t2).$$

Using the method of elimination, we first solve for k. One equation is subtracted from the other and the common term ln(C) is eliminated yielding $$\ln(ST2 - YODAT2) - \ln(ST1 - YODAT2) = k(t2) - k(t1)$$

$$\ln(ST2 - YODAT2) - \ln(ST1 - YODAT2) = k(t2 - t1)$$

$$k = \frac{\ln(ST2 - YODAT2) - \ln(ST1 - YODAT2)}{(t2 - t1)}$$

$$k = \frac{\ln\left(\frac{ST2 - YODAT2}{ST1 - YODAT2}\right)}{(t2 - t1)}$$

Knowing the value of k, we can substitute this value and solve for C.

$$\ln(ST1 - YODAT2) = \ln(C) + kt1$$

$$\ln(ST1 - YODAT2) =$$

$$\ln(C) + \frac{\ln(ST2 - YODAT2) - \ln(ST1 - YODAT2)}{(t2 - t1)}(t1)$$

$$\ln(C) = \ln(ST1 - YODAT2) - \frac{\ln(ST2 - YODAT2) - \ln(ST1 - YODAT2)}{(t2 - t1)}(t1)$$

$$C = e^{\left[\ln(ST1 - YODAT2) - \frac{\ln(ST2 - YODAT2) - \ln(ST1 - YODAT2)}{(t2 - t1)}(t1)\right]}$$

$$C = e^{\left[\ln(ST - YODAT2) - \frac{\ln\left(\frac{ST2 - YODAT2}{ST1 - YODAT2}\right)}{(t2 - t1)}(t1)\right]}$$

We will use as an example three intervals to see how PAST can be calculated: naturally warming, maintaining set point (STSP), and naturally cooling. Space temperature (ST) is a function of time (t).

$$ST(t) = \begin{cases} YODAT1 - Ce^{kt} & t1 \leq t < t2 \\ STSP & t2 \leq t < t3 \\ Ce^{kt} + YODAT2 & t3 \leq t \leq t4 \end{cases}$$

where

STSP represents space temperature set point.

Knowing the value of k for warming and cooling, we can predict PAST. In one instance as FIGS. 10A and 10B illustrate, there may be a period of natural warming, a steady period (temperature at STSP), and a period of natural cooling. Finding the average (PAST) may be done the following way:

$$PAST = \frac{1}{t4 - t1} \int_{t1}^{t4} ST(t)dt$$

$$= \frac{1}{t4 - t1}\left[\int_{t1}^{t2}(YODAT1 - Ce^{kt})dt + \int_{t2}^{t3}(STSP)dt + \int_{t3}^{t4}(Ce^{kt} + YODAT2)dt\right]$$

Using the value of k from the historical data and the difference in indoor and outdoor temperatures (plus the value of B or AB), we can predict when the ST of the structure will be at STSP as the building warms using: STSP=YODAT1−$Ce^{kt}$. Solve for t. This is t2. This defines an interval of natural structural warming [t1, t2].

While the structure is at STSP and the cooling system cycles, this will define the next interval [t2, t3] as the value of t3 can be obtained from predicted weather (the time at which YODAT2=STSP) after the heat of the day (YODAT2 being the outdoor air temperature minus the value of above B or AB).) The interval of time through which the structure naturally cools will define the third interval [t3, t4]. t4 would be the time at which the outdoor ambient conditions are desirable to condition the structure. Again, t4 can be obtained from predicted hourly weather (hourly, minutely, etc.) and may be set, in one embodiment, to a time at which it is desirable to condition the space. In another embodiment, t4 may be a time at which YODAT=STSP, etc.

The expansion of each interval in the calculation of PAST is shown below.

$$\int_{t1}^{t2}(YODAT1 - Ce^{kt})dt = \int_{t1}^{t2}(YODAT1)dt2 - \int_{t1}^{t2}1(Ce^{kt})dt$$

$$= (YODAT1)t\Big|_{t1}^{t2} - \frac{C}{k}(e^{kt})\Big|_{t1}^{t2}$$

$$= (YODAT1)(t2-t1) - \frac{C}{k}(e^{k(t2)} - e^{k(t1)})$$

$$\int_{t2}^{t3}(STSP)dt = (STSP)t\Big|_{t2}^{t3}$$

$$= (STSP)(t3) - (STSP)(t2)$$

$$= STSP(t3 - t2)$$

$$\int_{t3}^{t4}(Ce^{kt} + YODAT2)dt = \int_{t3}^{t4}3(Ce^{kt})dt + \int_{t3}^{t4}(YODAT2)dt$$

$$= \frac{C}{k}(e^{kt})\Big|_{t3}^{t4} + (YODAT2)t\Big|_{t3}^{t4}$$

$$= \frac{C}{k}(e^{k(t4)} - e^{k(t3)}) + (YODAT2)(t4 - t3)$$

When considering the teachings herein above, one skilled in the art could determine PAST using the conditional processes described herein above for various scenarios.

The predicted average space temperature (PAST) for the next period, e.g. the next day, could be extracted from a user-supplied temperature schedule, default temperature schedule, historical user entry data, a combination of these, the equations given herein above, etc. The NTotal_heat_transferred value is that which the system 10 would try to achieve in order to condition the structure in preparation of the next day, however, upper and lower limits may inhibit the value being too high or low, and/or upper and lower limits may inhibit the operations to achieve NTotal_heat_transferred in order to keep the space temperature within reasonable limits. The appropriate limits on the operations of the systems may be understood by one skilled in the art, when considering the teachings herein disclosed.

In one embodiment, NTotal_heat_transferred may be calculated by:

NTotal_heat_transferred=((PAODAT−PAST)−AB)/AM where
AM represents an average M, as previously defined,
AB represents an average B, as previously defined,
PAODAT represents a predicted average outdoor air temperature, and
PAST represents a predicted average space temperature over a period.

If volumetric flow rates of the system 10 are known in real units of measure (i.e. CFM,) then industry standard calculations could be made to determine the real value, in terms of real units of measure (i.e. BTU), of heat transfer. Also an amount of energy produced inside the structure due to people, computers, lights, etc., which is referred to as IHEPIS (the value of the x-intercept of the graph in FIG. 9 multiplied by −1) could be calculated using real units of measure (e.g., BTU's). Also, if the surface area of the structure's envelope is known, then the R-value of the structure's envelope could be computed using the slope of (AODAT−AST)/Total_heat_transferrred, although if for instance a window was left open, the resulting heat transfer would affect the calculated R-value.

Additionally, k could be used to calculate the effective thermal capacity of the structure.

Subsequent to determining NTotal_heat_transferred, the system 10 may operate various components to effect ventilation, cooling, and/or heating at step 460 based upon the calculated NTotal_heat_transferred value. In a simplified example, the following table shows the AODAT, AST, and total_heat_transferred over three days (i.e. three time periods). Please note that this example may not be typical, but rather is given for illustrative purposes.

| Day | Monday | Tuesday | Wednesday |
|---|---|---|---|
| AODAT | 70° F. | 90° F. | 50° F. |
| AST | 68° F. | 68° F. | 68° F. |
| Total_heat_transferred | −100° F.-min | −600° F.-min | 200° F.-min |

In this example, M1 is the slope for the graph comparing Total_heat_transferred to (AODAT−AST) from Monday to Tuesday, and M2 is the slope from Tuesday to Wednesday. M1 and M2 may be calculated as:

M1=((70−68)−(90−68))/((−100)−(−600))=−1/25

M2=((90−68)−(50−68))/((−600)−200)=−1/20

Therefore, the average slope, AM=((−1/25)+(−1/20))/2=−0.045. Next, the y-intercept (B1) from Monday to Tuesday, and B2 from Tuesday to Wednesday would be calculated as follows:

B1=(70−68)−(−100)*(−1/25)=−2° F.

B2=(50−68)−(200)*(−1/20)=−8° F.

Therefore, the average B, AB=((−2)+(−8))/2=−5° F. If PAODAT for Thursday was calculated as 75° F., and PAST for Thursday was calculated as 68° F., NTotal_heat_transferred could be calculated for this example as:

NTotal_heat_transferred=((75−68)−(−5))/(−0.045)=−267° F.-min.

This means that the system would cool the structure on Thursday, transferring −267° F.-min of heat energy to do so. Therefore, during the time when conditions were optimal (usually from 4-6 am), the system would bring in cool outdoor air for a certain amount of time until the total heat transferred reached the −267° F.-min necessary to meet the day's predicted cooling requirements. Alternatively, the system could also activate mechanical cooling (i.e. compressors, refrigeration systems, etc.) to cool the structure. If NTotal_heat_transferred were a positive value, then the system could heat the structure instead of cooling it. If opportune, this could be done during the heat of the day by bringing in outdoor air and exhausting indoor air, or alternatively, with mechanical heating (i.e. heat pumps, etc.) if conditions warranted such action.

The internal heat energy produced inside a structure, due to things like lighting, computers, etc. is referred to herein as: "IHEPIS".

In order to model IHEPIS, at least two periods with varying Total_heat_transferred and (AODAT−AST) values may be used in order to determine a slope M, which has a correlation to the R-value of that structure's envelope. IHEPIS may be calculated as the value of −1 multiplied by the x-intercept of the graph, shown as exemplary FIG. 9 comparing Total_heat_transferred to (AODAT−AST). Once the average slope (AM) and average y-intercept (AB) are known over a time span, IHEPIS could be calculated as:

IHEPIS=−1*(−AB/AM)

where

AB=average y-intercept B, as defined previously, and

AM=average slope M, as defined previously.

As one skilled in the art will readily understand upon a careful reading of the teachings herein, space temperature set point may be used rather than space temperature to operate many of the functions, calculations, and equations disclosed herein.

Figure 11:
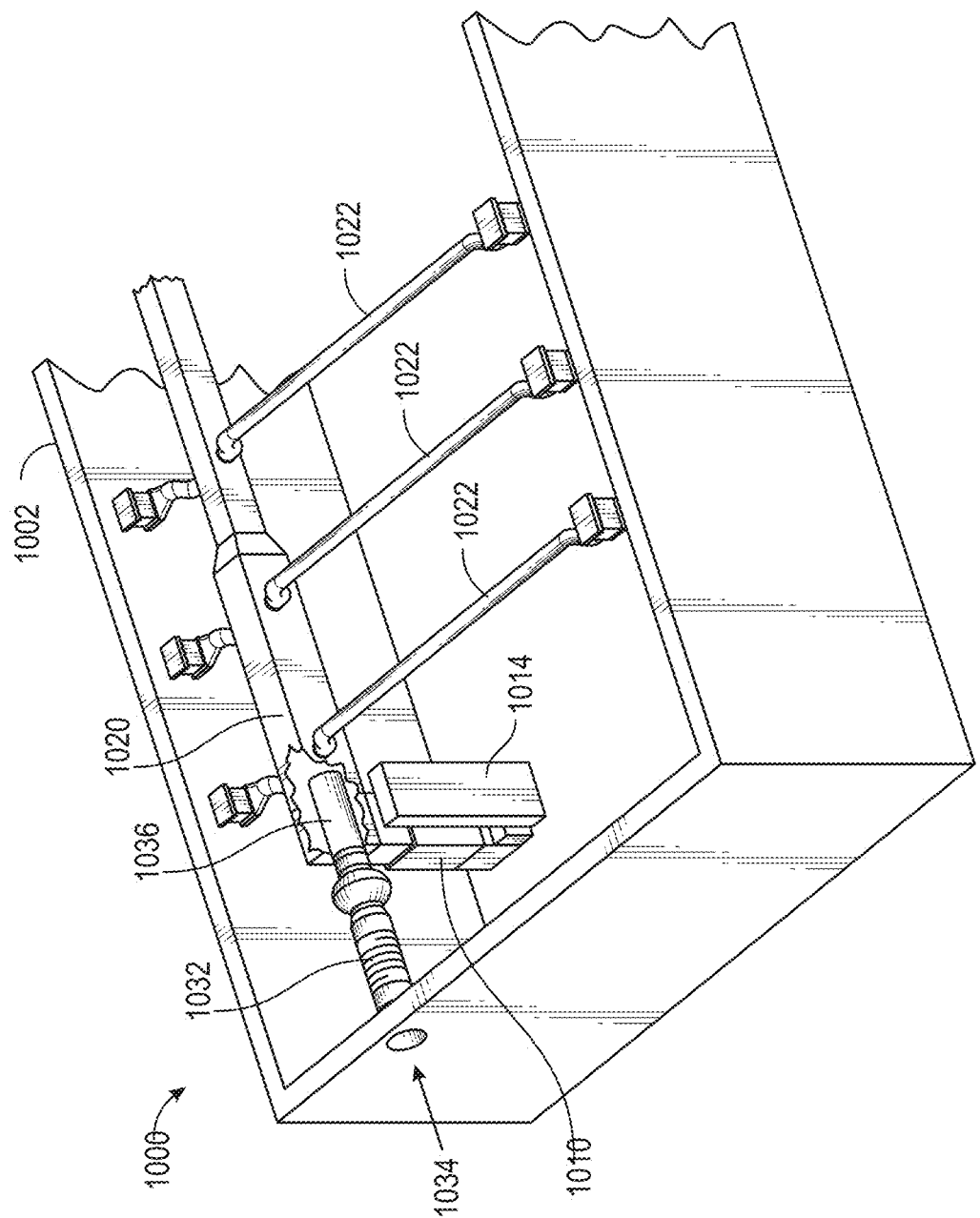
FIG. 11 shows an exemplary indoor climate control system for an exemplary building, in accordance with the present disclosure.

FIG. 11 shows an exemplary indoor climate control system 1000 for an exemplary building 1002 that may help implement the methodologies of the present disclosure. The system 1000 includes a forced air device 1010, a supply-plenum 1012, a trunk supply line 1020, a plurality of takeoff runs 1022, and a fresh air supply injection apparatus 1030. The supply line 1020 may be attached to the supply-plenum 1012 via a flex connector (i.e. "canvas-connect"), as is known in the art. One skilled in the art will readily recognize that the return air duct 1014 may be connected to a trunk line. The device 1010 is a furnace in one embodiment, having a blower configured to force air through a supply line 1020. In one embodiment, the forced air device is an air conditioning unit configured with a blower to force air through the supply line 1020. The system 1000 is shown as exemplary, one skilled in the art, upon a careful reading of the teachings herein will recognize that many duct arrangements, and quantities of duct runs, may be included or attached to the system 1000. A partial return air duct 1014 is shown for ease of description and it should be recognized that the return air duct 1014 may include one or more trunk runs, duct branches, boots, grills, and registers.

The supply-plenum 1012, the supply line 1020, and the plurality of takeoff runs 1022 may be formed of sheet metal, but may be formed of duct board, foam board, or any other suitably rigid material. The takeoff runs 1022 may be rigid sheet metal ducts or flexible ducts. Flexible ducts are typically formed of a wire-reinforced core, an insulation layer, and an outer sheath. Ducts may terminate at duct boots that connect the ducts to air-terminals (i.e. ceiling diffusers, floor registers, etc.) arranged in the floor, walls, or ceiling of a room.

Oftentimes natural gas burning forced air equipment, like furnaces or roof-mounted packaged HVAC units, will have a manufacturer's rating of the maximum amount of fresh air, typically as a proportion of the total return air, which may pass across the heat exchanger, when utilizing natural gas for heating. Building codes may specify a minimum amount of fresh air to intake for a particular building. The equipment manufacturers may specify a maximum amount of fresh air injection to the return air stream as the cold winter air may cause the rapid contraction of portions of the heat exchanger and cause the heat exchanger to crack if the temperature differences are too extreme. Known solutions are to install additional, or larger, equipment to meet the minimum amount of fresh air required, while operating under the maximum fresh air allowed for the equipment.

While FIG. 11 depicts the device 1010 as a conventional furnace, one skilled in the art should recognize that the teachings herein may be applied to various roof-top-units (RTU), which may be used in conjunction with the device 10 or as an alternative. In one embodiment, an RTU may have a fan 1038 inside the unit 1010 and be configured to direct the injection air into supply line 1020, from within the unit's enclosure, drawing air from a hood 1042, or by other means, from outside the RTU. In another embodiment, an RTU has a fan inside or outside the unit and directs the injection air into the main supply line 1020 from within the unit's enclosure. In one embodiment, the injection duct 1036 is wholly located within the RTU, and in another embodiment the injection duct 1045 is located partially inside the RTU and partially inside the supply ducting connected to the RTU. In cases where particular zones of an RTU, which services a plurality of zones, may require significantly more outdoor air than other zone of the same RTU (like in a kitchen for example), the injection duct 1036 may be located at a main supply duct which only services a particular zone, or a specific set of zones.

Figure 17:
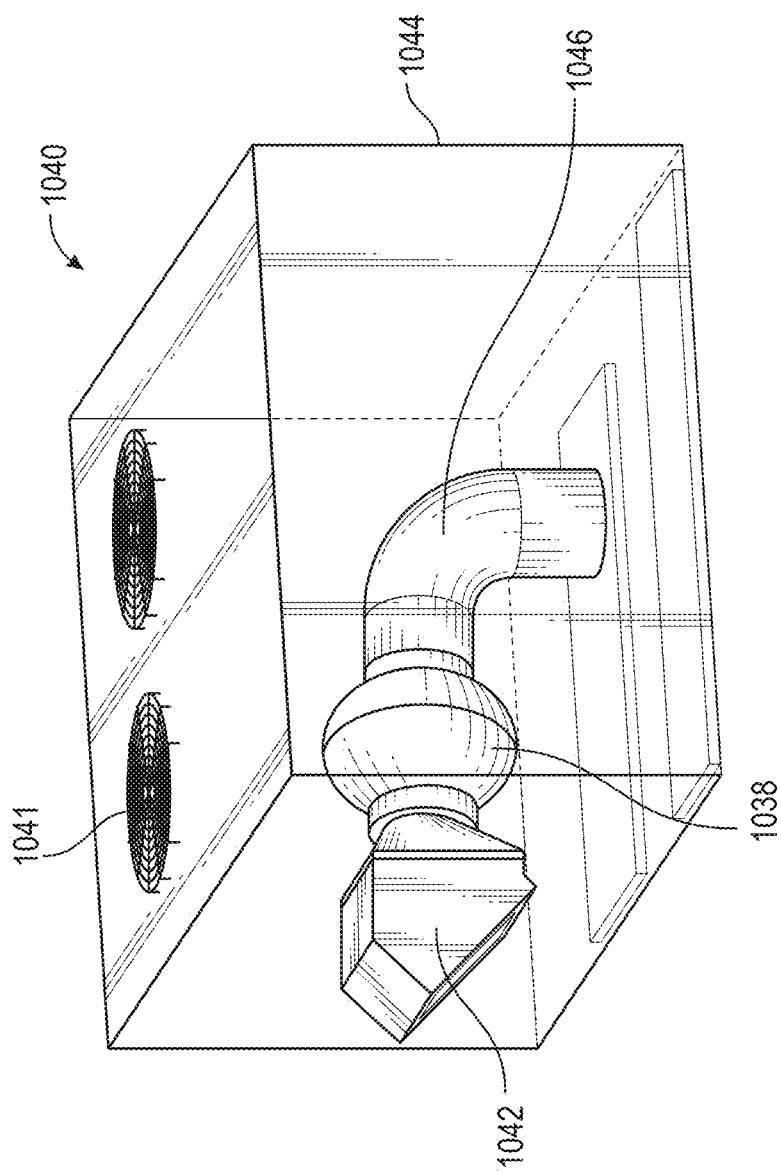
FIGS. 17 and 18 show exemplary roof-top-units that may be used in conjunction with the above disclosures, in accordance with the present disclosure.
Figure 18:
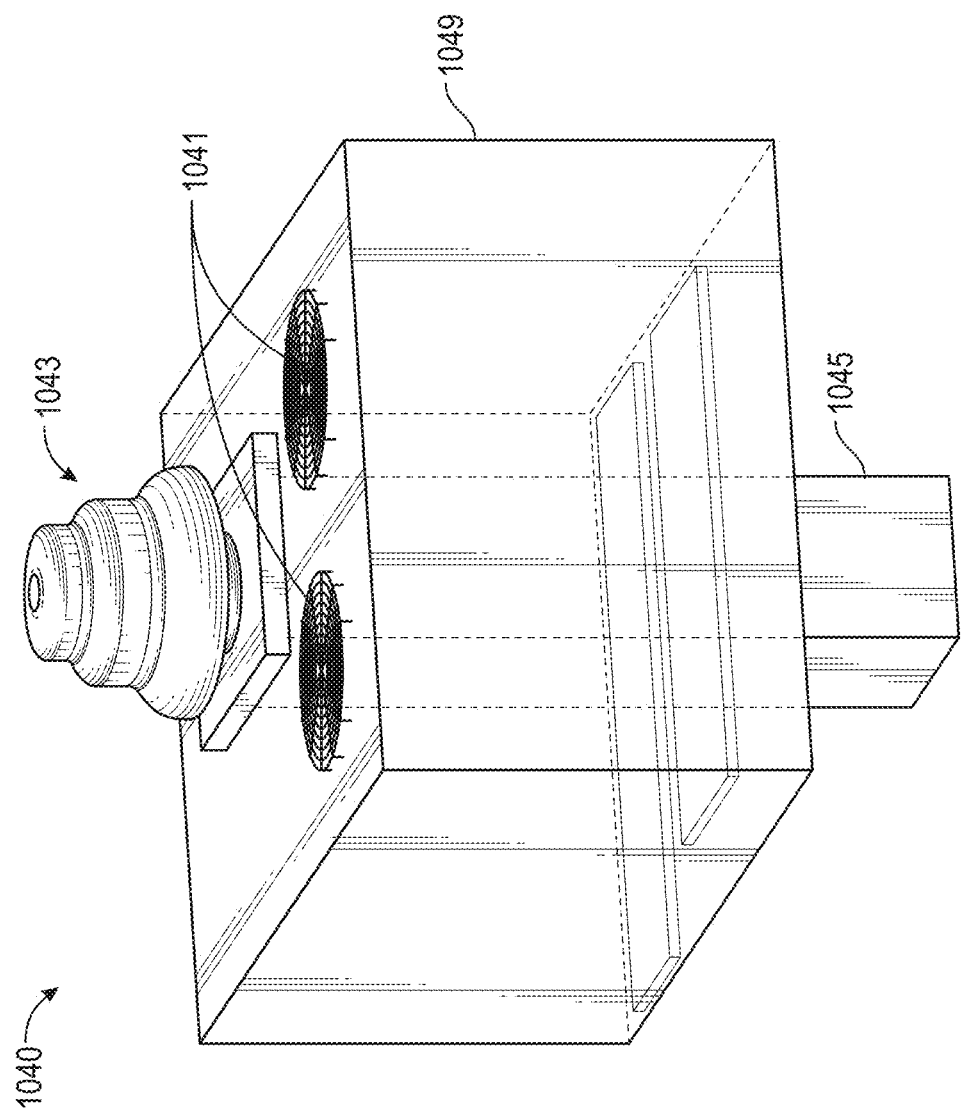

In one exemplary embodiment, an RTU has a blower configuration capable of moving a maximum amount of air and an injection fan such as fan 1038 shown in FIG. 17, or an exemplary down-blast fan 43 shown in FIG. 18 capable of moving a maximum amount of air which is equal to the amount of air that the blower can move. In this embodiment, an opening of the supply ducting may be larger than the area of the opening for the return ducting. In this embodiment, the supply ducting may have a larger cross-sectional area than that of a typical RTU.

FIGS. 12-15 show the furnace 1010, the supply-plenum 1012, and a partial view of the exemplary supply line 1020. As FIGS. 12-15 show, the fresh air supply injection apparatus 1030 can be disposed within the supply line 1020 using different duct configurations. The apparatus 1030 includes an exterior vent 1034 and an injection duct 1036 that terminates within a supply line, such as the supply line 1020 shown. The injection duct 1036 is positioned within a supply line 1020 downstream of the exterior vent 1034. The apparatus 1030 may include any number or arrangement of ducts and connectors to connect the exterior vent 1034 to the injection duct 1036, such as duct portion 1032. For example, the fan 1038 may be connected to a reducer duct to increase an inlet duct size of the fan's inlet ducting, relative to the fan's outlet size. In an exemplary embodiment, the cross-sectional area of the fresh air supply injection apparatus' 1030 fan's 1038 inlet ducting may be double the cross-sectional area of the centrifugal fan's outlet size. The duct 1032 may be a rigid or flexible duct. The vent 1034 permits outside air to flow into the apparatus 1030 or be drawn in by a fan.

In one embodiment, a damper 1060 may be included to regulate airflow within the apparatus 1030. The damper 1060 may be a barometric damper configured to prevent backdraft of air from the supply line 1020 from exiting the structure when the fan 1038 is off. In one embodiment, the damper 1060 may be electronically actuated via the device 1050. In one embodiment, the injection fan 1038 and/or the damper 1060, which is in line with the injection fan's airstream, is controlled such that the intake of outdoor air is ceased under certain conditions, such as an indoor fire, an outdoor fire, a biological emergency affecting outdoor air quality (OAQ), or other relevant conditions.

In one embodiment, one or more filters may be included. In another embodiment, an energy recovery ventilator (ERV) may be included within the apparatus 1030, which may be beneficial in applications where a large volume of outside air needs to be introduced into the structure while the structure is occupied.

In one embodiment, fresh air supply injection apparatus 1030 is inserted into the supply line 1020, or alternatively into the supply-plenum 12, using a mounting plate. The mounting plate may be spot-welded to the injection duct 36 and may be mechanically joined to the supply line 1020 or the supply-plenum 12. An injection fan 1038 may be connected to the end of the injection duct 36, which may extend about two inches beyond the mounting plate. In this way, when the injection duct 36 is inserted into the supply line 1020, the injection fan 1038 is very near the supply line 1020. In this embodiment, preferably, the injection fan 1038 and the injection duct 36 may be roughly balanced at the point of the mounting plate, so that at the mounting plate, the weight of the injection fan plus part of the injection duct 36 on one side of the plate and the length of injection duct 36 on the other side of the mounting plate may roughly weigh the same amount—in this embodiment there would be little or no horizontal force on the mounting plate.

As FIGS. 12-15 show, the fresh air supply injection apparatus 1030 includes the injection duct 1036 which is an airduct of the fresh air supply injection apparatus 1030 that is substantially parallel with the supply line 1020 and terminates within the supply line 1020. In various embodiments, the injection duct 36 is one to ten feet of duct mounted within the supply line. The injection duct 1036 should ideally have a length for preferential gaseous communication of the fresh air intake into the supply line 1020 at a flow that is parallel with sidewalls of the supply line 1020.

In various embodiments, the fresh air supply injection apparatus 1030 includes a duct section 1032 connecting the exterior vent 1034 to a fan 1038. The fan 1038 is disposed within the duct in gaseous communication with the exterior vent 1034 and configured to inject fresh air into the supply line 1020. As described hereinabove portions of the apparatus 1030 may be flexible duct including duct section 1032. The fan 1038 may be a centrifugal fan operated with a variable frequency drive in some embodiments.

Figure 12:
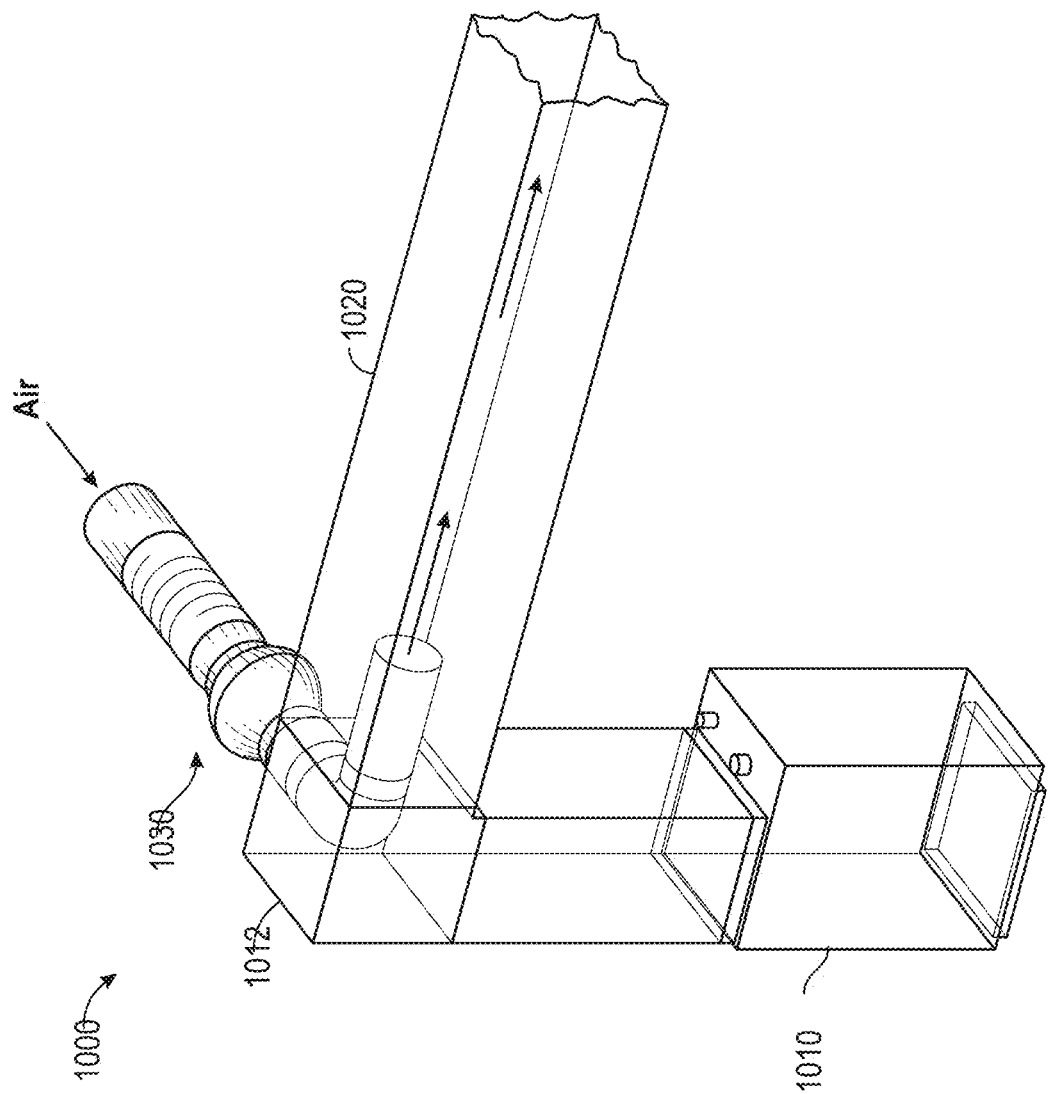
FIGS. 12-15 show embodiments of an exemplary fresh air supply injection apparatus, in accordance with the present disclosure.
Figure 13:
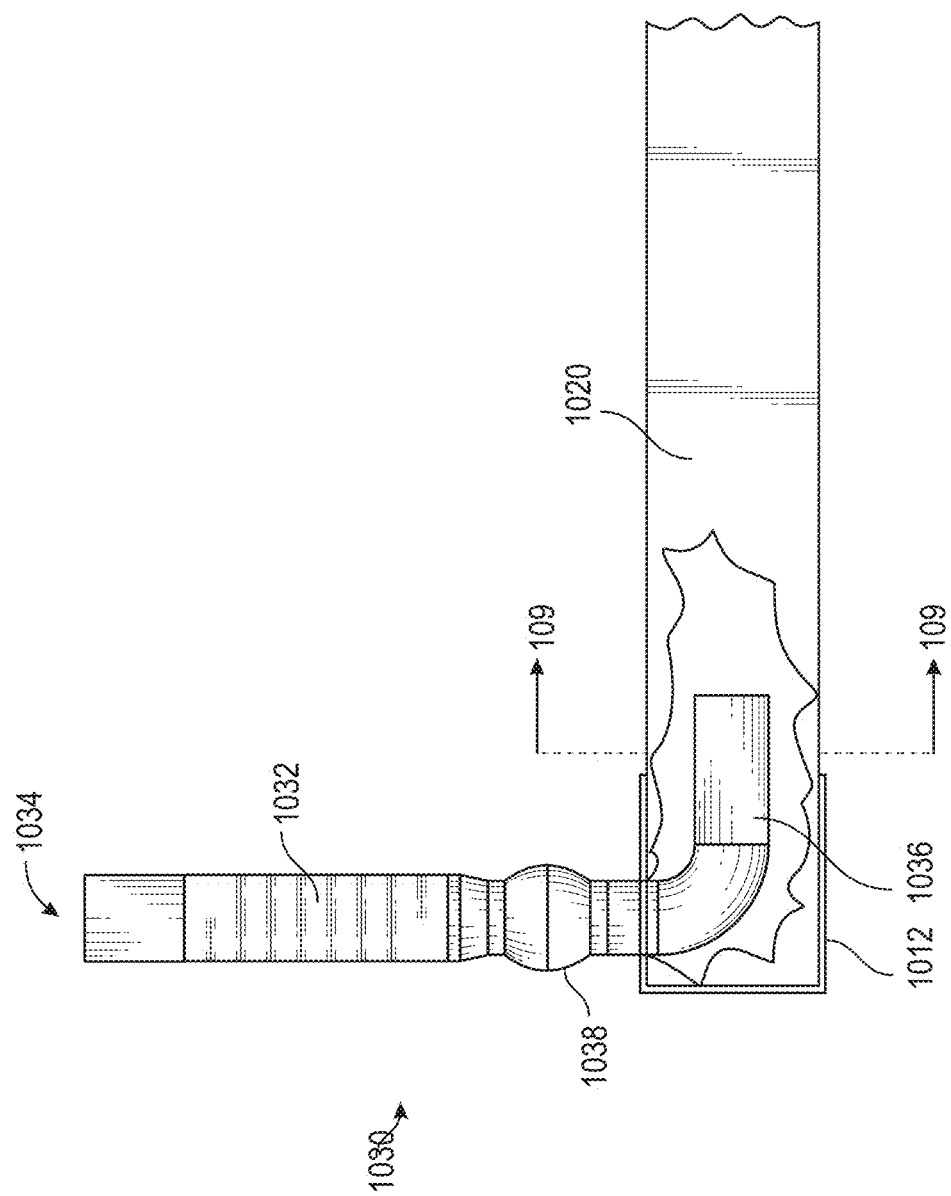

FIGS. 12 and 13 show the fresh air supply injection apparatus 1030 inserted into the supply-plenum 1012 using a 90-degree elbow duct connector. The apparatus 1030 may be mounted within the supply line 1020 at most any angle or using most any type of duct connector, provided the injection duct 1036 within the supply line 1020 is substantially parallel with the sidewalls of the supply line 1020.

Figure 14:
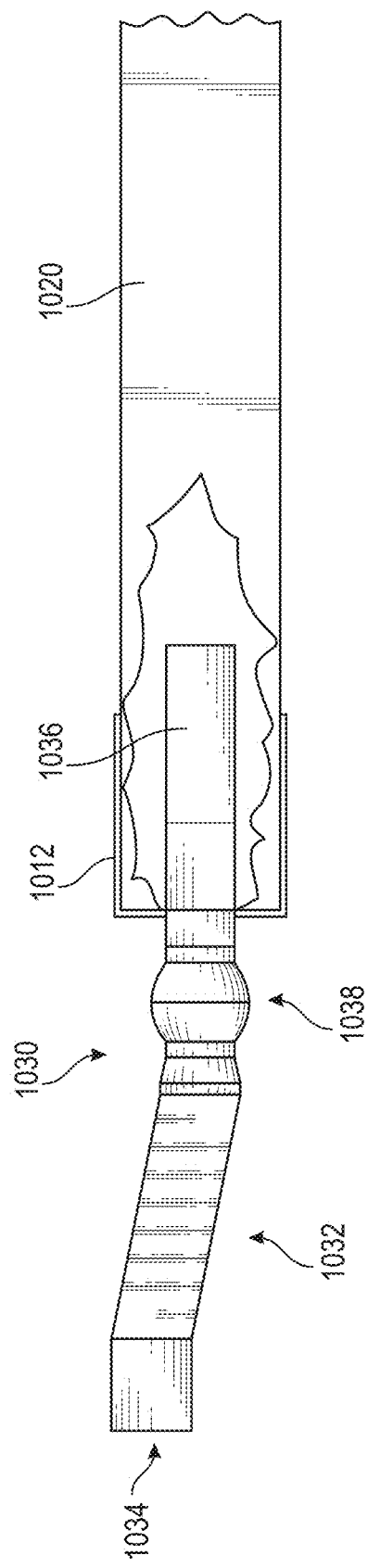

FIG. 14 shows an exemplary fresh air supply injection apparatus 1030 illustrating a substantially straight duct connection into the supply-plenum 1012 and the supply line 1020. The supply-plenum 1012 and the supply line 1020 are shown in a cutaway view to depict disposition of the injection duct 1036 within the supply line 1020. The duct section 1032 is illustrated as an exemplary flexible duct connecting the vent 1034 with the fan 1038.

Figure 15:
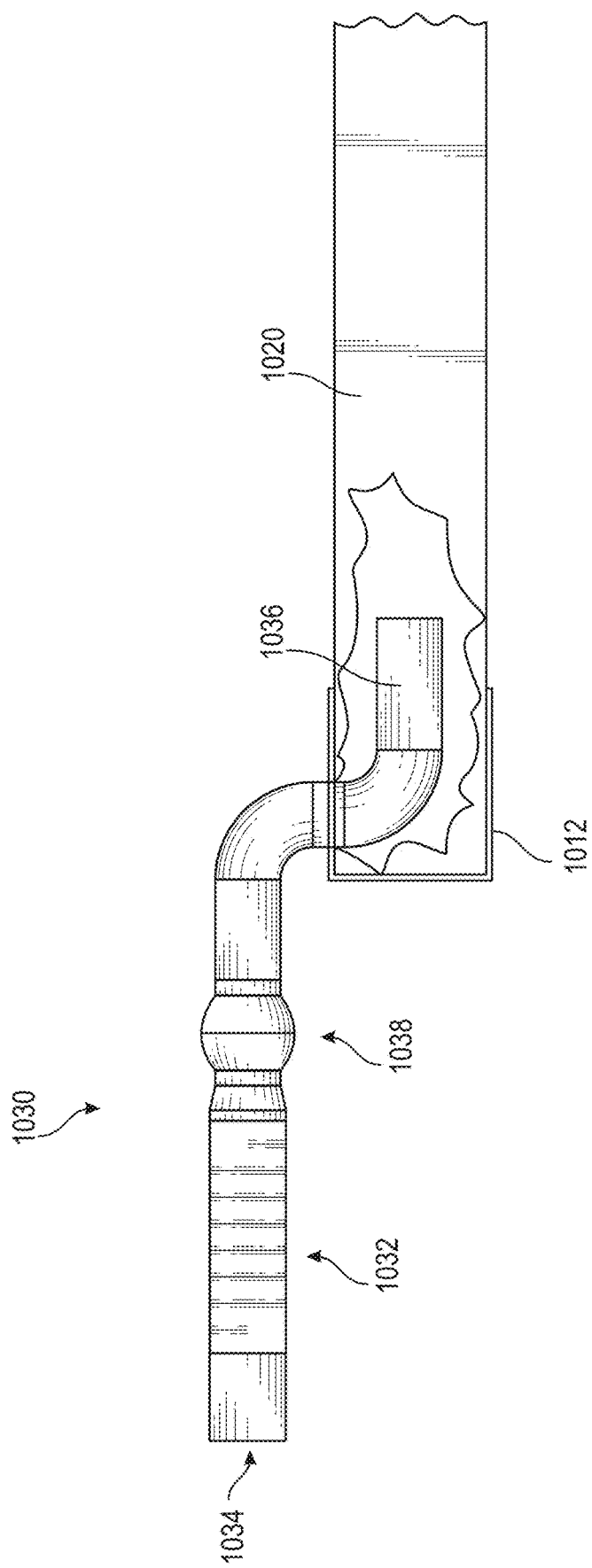

FIG. 15 shows an exemplary fresh air supply injection apparatus 1030 illustrating a double 90-degree duct connectors into the supply-plenum 1012 and the supply line 1020. The supply-plenum 1012 and the supply line 1020 are shown in a cutaway view to depict disposition of the injection duct 1036 within the supply line 1020. The duct section 1032 is illustrated as an exemplary flexible duct connecting the vent 1034 with the fan 1038.

Figure 19A:
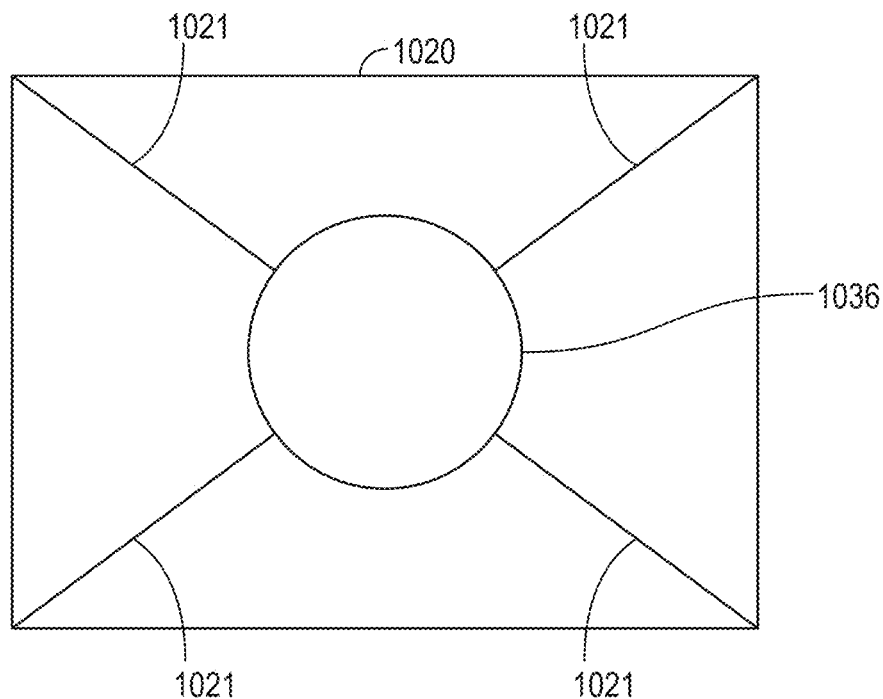
FIGS. 19A-19D show a cross-sectional views taken across line A-A of FIG. 13, in accordance with the present disclosure.
Figure 19B:
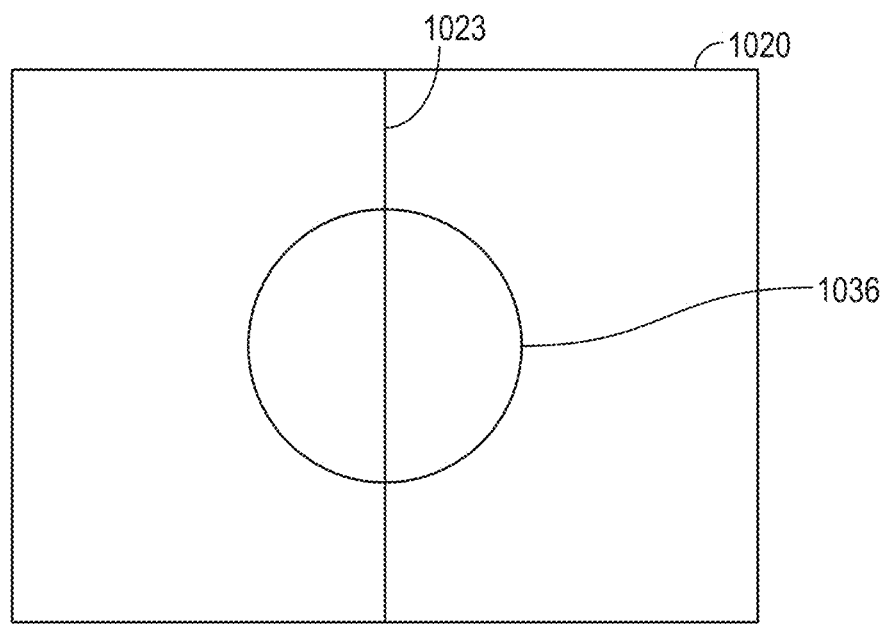
Figure 19C:
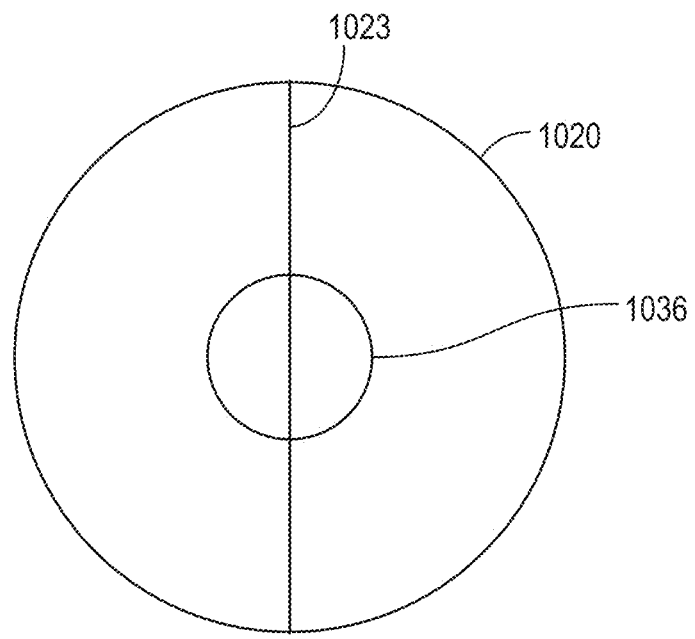
Figure 19D:
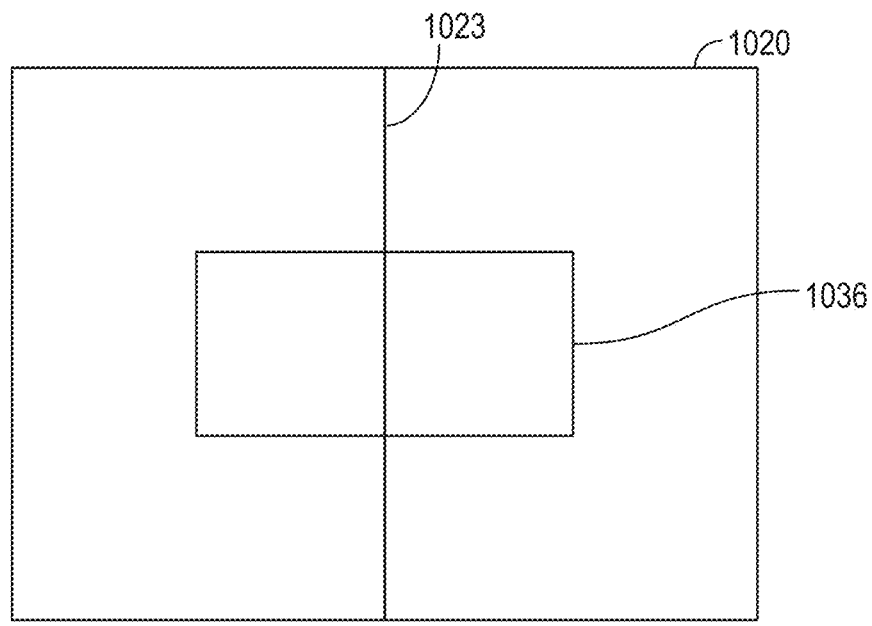

FIGS. 19A-19D show cross-sectional views taken across line A-A of FIG. 13. FIG. 19A shows a rectangular cross-sectional shape of the supply line 1020 and a circular cross-sectional shape of the injection duct 1036. FIG. 19B shows a rectangular cross-sectional shape of the supply line 1020 and a circular cross-sectional shape of the injection duct 1036 supported by supports 23. FIG. 19C shows a circular cross-sectional shape of the supply line 1020 and a circular cross-sectional shape of the injection duct 1036 supported with a support 23. FIG. 19D shows a rectangular cross-sectional shape of the supply line 1020 and a rectangular cross-sectional shape of the injection duct 1036 supported with a support 1023.

As FIGS. 19A-19D show, the injection duct 1036 is disposed within the supply line 1020 at a substantially central position with respect to the sidewalls. In various embodiments, the injection duct 1036 may be braced from the sidewalls using, for example, a plurality of mechanical elements 21, which could be spaced over the length of the injection duct 1036. The mechanical elements may be braces, hooks, threaded rod, conduct, shelf or other rigid structure configured to hold the injection duct 1036. In some embodiments, the injection duct 1036 may be rested on the bottom sidewall. In some embodiments, the injection duct 1036 is hung from the top sidewall using, e.g., steel wire, threaded rod, a mechanical hook, or other mechanical fastener. As FIGS. 19B-19D show, a threaded rod 1023 may be inserted through the supply line 1020 and the injection duct 1036. The threaded rod, or other like mechanical fastener, may be inserted at various angles in alternative embodiments.

Figure 16:
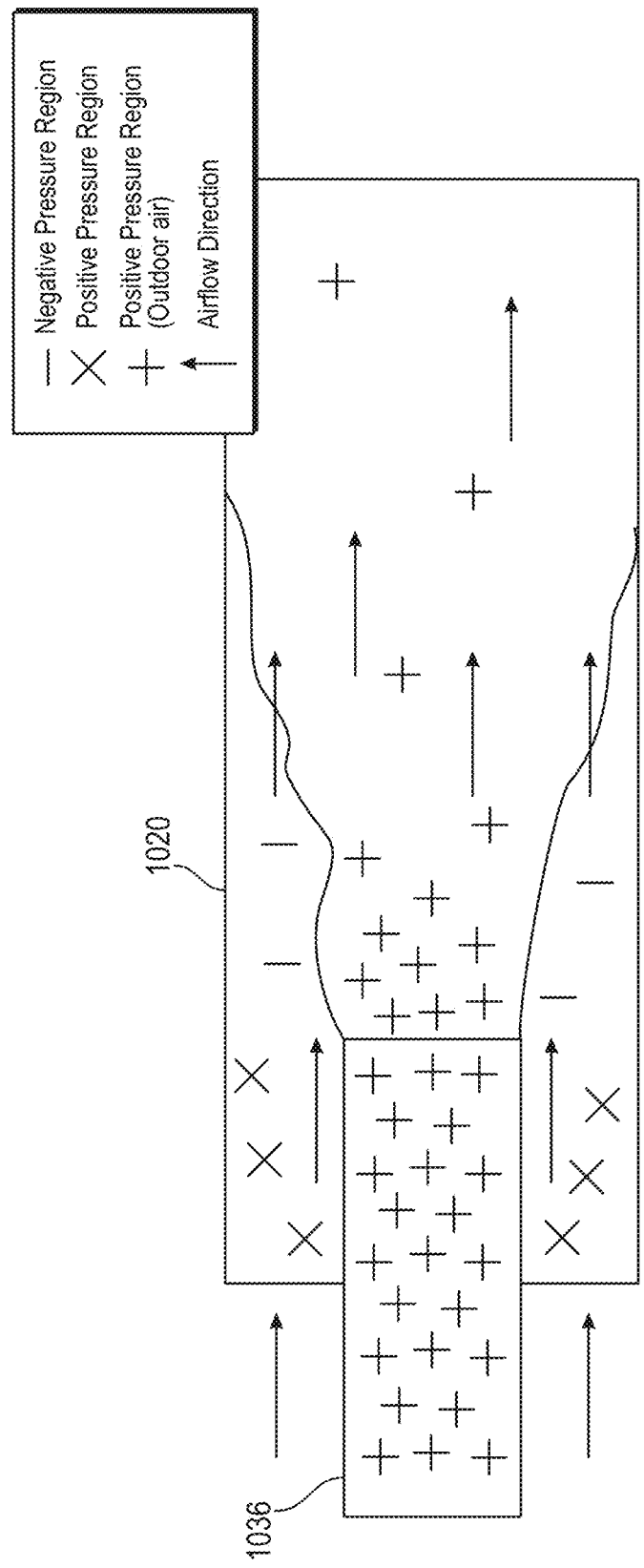
FIG. 16 is a graphical view of the air pressure within an injection duct and a supply line when fresh air is injected into the supply line while heated air is pushed into the supply line simultaneously, in accordance with the present disclosure.

FIG. 16 is a graphical view of the relative air pressure variances which may occur within the injection duct 1036 and the supply line 1020 when fresh air is injected into the supply line 1020 under certain conditions and in some embodiments of the invention. As FIG. 16 shows, injection of the fresh air into the supply line may create a positive pressure region in the center of the supply line, and outwardly going downstream. Initially, the fresh air supply injection apparatus 1030 generates the positive pressure region by directing gas into the supply line 1020. The injection of the fresh air creates a positive pressure region in the center, and therefore a corresponding negative pressure region on the sides, which diminishes downstream. The movement of the air in the air stream produced by the fresh air supply injection apparatus 1030 within this positive pressure region will cause a vortex effect, which will induce a draft of the air within the supply line 1020. The induced air flow within the supply line 1020 will mix with the air in the air-stream, created by the fresh air supply injection apparatus 1030, roughly in inverse proportion to the slowing of the air stream created by the fresh air supply injection apparatus 1030, so long as the static pressure of the supply line 1020 is relatively low, in consideration of the flowrate of the air stream created by the fresh air supply injection apparatus 1030. There can be loss due to static friction with the supply duct 1020, but in many embodiments the static friction caused by operating the fresh air supply injection apparatus 1030, but not the blower of the device 1010, is practically negligible compared to common HVAC system designs. In this embodiment, fresh air injected into the supply duct 1020, causes a relatively negative pressure region behind the injection location of the outdoor air injection location, which would induce a draft from the device 1010, down the supply line ducting 1020, past the fresh air injection duct 1036 location, down the supply ducting 1020, and out of the supply air terminals. In this embodiment, this pressure change will occur regardless of whether or not the device 1010 is actively blowing air, so long as the velocity of the air discharged by the fresh air supply injection apparatus 1030 is greater than the supply ducting's 1020 air velocity which is resultant from the operation of the device 1010.

FIG. 17 shows an embodiment with an interior mounted fan 1038 and a 90-degree duct component 1046 that injects the outdoor air air-stream into the supply ducting. FIG. 18 shows a RTU embodiment with an exterior mounted fan 1043 in gaseous communication with duct 1045 that may be inserted into the interior supply line ducts within the building structure. Condenser fan grills 1041 are shown to provide context, one skilled in the art should recognize that the invention should not be limited thereby.

In various embodiments, the fans 1043 and 1044 are low differential-pressure fan(s). In various embodiments, the fans 1043 and 1044 are mounted on a roof or within an attic or on a side-wall of the structure, or on HVAC equipment (i.e. "powered exhaust") and may selectively remove air from an interior space and/or ventilate and cool the attic space by removing indoor air and effectively acting as a turbo-charger (like for a turbo-charged automobile engine) for the outdoor air injection fan(s) which inject outdoor air into the structure. For example, the injection fan(s) could be operated in the morning to bring in cool outside air while the low differential pressure attic fan might be utilized to effectively remove hot stratified air from the building in advance of higher outside temperatures. By dropping the space temperature inside the building prior to the heat of the day, during the early morning hours, and by cooling the attic, something of a thermal-buffer can be created, wherein the attic and the building spaces can absorb substantial heat energy before refrigerant-based cooling might be needed. The net result of the implementation of this precooling results in more efficient energy consumption.

Figure 20:
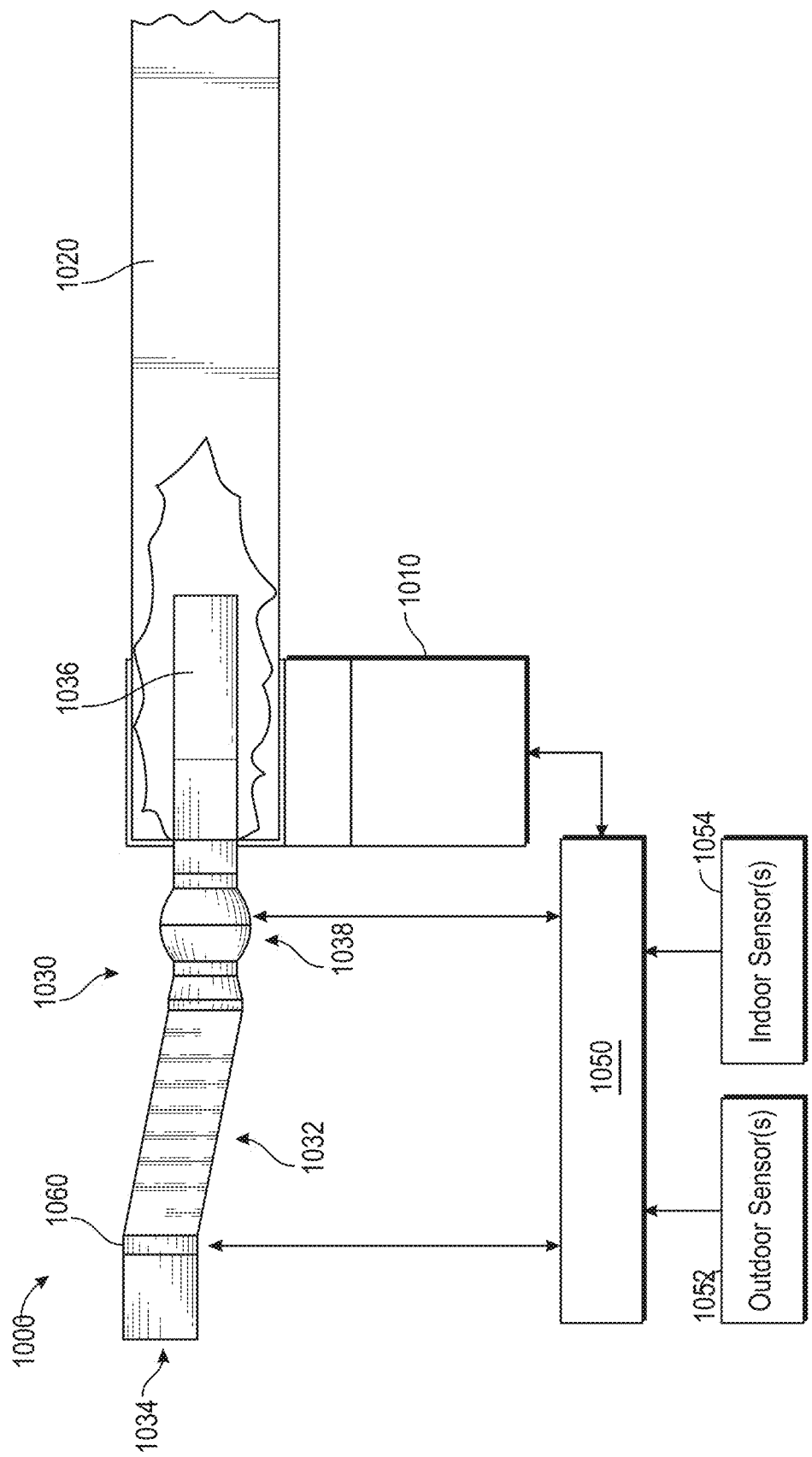
FIG. 20 schematically shows the indoor climate control system, in accordance with the present disclosure.

FIG. 20 schematically shows the indoor climate control system 1000. As FIG. 20 shows, an indoor climate control device 1050 is communicatively connected with the device 1010. In various embodiments the fan 1038 and/or the damper 1060 may also be communicatively connected to the device 1050. Outdoor sensors 1052 and indoor sensors 1054 are connected to transmit information to the indoor climate control device 1050.

The device 1050 can include a processor module and any digital and/or analog circuit elements, comprising discrete and/or solid-state components, suitable for use with the embodiments disclosed herein. One skilled in the art will recognize upon a careful reading of the teachings herein that a radio processor may be included in another embodiment of the device 1050 for wireless communication. In one embodiment, a communication adapter and/or transceiver is utilized for wireless communication over one or more wireless communications channels. Although the device 1050 is shown as separate components, such an illustration is for ease of description and it should be recognized that the functions performed by the device 1050 may be combined on one or more components.

The processor module within the device 1050 may be configured to execute various computer programs (e.g., software, firmware, or other code) such as application programs and system programs to provide computing and processing operations for the device 1050. In various embodiments, a processor module may be implemented as a host central processing unit ("CPU") using any suitable processor or logic device, such as a general-purpose processor, or other processing device in alternative embodiments configured to provide processing or computing resources to device 1050. For example, processor module may be responsible for executing various computer programs such as application programs and system programs to provide computing and processing operations for device 1050. The application software may provide a graphical user interface ("GUI") to communicate information between device 1050 and a user. The computer programs may be stored as firmware on a memory associated with processor, may be loaded by a manufacturer during a process of manufacturing device 1050, and may be updated from time to time with new versions or software updates via wired or wireless communication.

System programs assist in the running of a computer system. System programs may be directly responsible for controlling, integrating, and managing the individual hardware components of the computer system. Examples of system programs may include, for example, an operating system, a kernel, device drivers, programming tools, utility programs, software libraries, an application programming interface ("API"), a GUI, and so forth.

The memory module is preferably coupled to the processor module. In various embodiments, the memory module may be configured to store one or more computer programs to be executed by the processor module. The memory module may be implemented using any machine-readable or computer-readable media capable of storing data such as volatile memory or non-volatile memory, removable or non-removable memory, erasable or non-erasable memory, writeable or re-writeable memory, and so forth.

A user input device may be coupled to or included with the device 1050. The user input device may include, for example, an alphanumeric, numeric key layout and an integrated number dial pad. The device 1050 also may include various keys, buttons, and switches such as, for example, input keys, preset and programmable hot keys, left and right action buttons, a navigation button such as a multidirectional navigation button, power/end buttons, preset and programmable shortcut buttons, a volume rocker switch, a ringer on/off switch having a vibrate mode, a keypad and so forth. In one embodiment, the device 1050 simply includes an ON and an OFF button, the other controls being activated through a wirelessly connected computing device, such as a mobile device or desktop computer.

An I/O interface may be coupled to the processor module. The I/O interface may include one or more I/O devices such as a serial connection port, an infrared port, Blue Tooth Low Energy (BLE), Mesh Networks, wireless capability, and/or integrated 802.11x (WiFi) wireless capability, to enable wired (e.g., USB cable) and/or wireless connection to a local or networked computer system, such as a workstation or mobile device.

A power supply may be configured to supply and manage power to components of device 1050 is preferably coupled to the processor module. In various exemplary embodiments, the power supply may be implemented by a rechargeable battery, such as a removable and rechargeable lithium ion battery to provide direct current ("DC") power, and/or an alternating current ("AC") adapter to draw power from a standard AC main power supply.

The device 1050 may include one or more transceivers coupled to the processor and an antenna, each transceiver may be configured to communicate using different types of protocol, e.g., Bluetooth®, Near Field Communications, Mesh network, etc., communication ranges, operating power requirements, RF sub-bands, information types (e.g., voice or data), use scenarios, applications, and so forth. For example, the transceiver may include a Wi-Fi transceiver and a cellular or WAN transceiver configured to operate simultaneously. In various embodiments, the transceiver is alternated for a transmitter and/or receiver.

In one embodiment, the device 1050 includes a plurality of sensors 1052 and 1054. The sensors may be directly coupled to the processor or connected through one or more other modules including, e.g., the I/O interface. In one embodiment, a humidity sensor is included. In one embodiment, a temperature sensor is included. In one embodiment, the temperature sensor, is an infrared reader.

The fan 1038 may be connected to a separate power supply from the device 1050. The fan 1038 can include a logic controller and a processor configured to receive operating instructions from the device 1050. The fan 1038 may be configured for selective operation and may be controlled based upon temperature and/or humidity readings from the device 1050. In one embodiment, the fan 1038 may include one or more operating states such as an ON operating state, an OFF operating state, and/or a plurality of varying power level operating states, which may be reported to the device 1050.

The damper 1060 may be connected to a separate power supply from the device 1050. The damper 1060 can include a logic controller and a processor configured to receive operating instructions from the device 1050. The damper 1060 is configured for selective operation and may be controlled based upon temperature and/or humidity readings from the device 1050. In one embodiment, the damper 1060 may include one or more operating states, i.e., opening positions, such as a FULLY OPEN operating state, a CLOSED operating state, and/or a plurality of varying open or closed operating states, which may be reported to the device 1050.

In various embodiments, the device 1050 may be communicatively connected to one or more exterior fan devices 1040. The fan devices 1040 can include a logic controller and a processor configured to receive operating instructions from the device 1050. The fan devices 1040 may be configured for selective operation and may be controlled based upon temperature and/or humidity readings from the device 1050. In one embodiment, the fan devices 1040 may include one or more operating states such as an ON operating state, an OFF operating state, and/or a plurality of varying power level operating states, which all may be reported to the device 1050.

The outdoor sensor(s) 1052 can include a temperature and/or humidity sensor to monitor local conditions and transmit to the device 1050. The indoor sensor(s) 1054 can include a temperature and/or humidity sensor to monitor inside the building conditions and transmit to the device 1050. The sensor(s) 1052 and 1054 can communicate information to the device 1050 upon determination, at various intervals, upon occurrence of trigger events, upon requests, or the like.

In one embodiment, an electronically commutated motor (ECM) or variable frequency drive (VFD), may be connected to the device 1050 and selectively controlled thereby. In this way, the device 1050 may control the ECM or VFD to control a total air flow in the supply line 1020 such that by modulating either the fan 1038, the blower of the device 1010, and/or dampers 1060, based on differential pressures, static pressures, readings from the sensors 1052 and 1054, equipment electricity consumption (such as amperage draw), and/or peto tube measurements. In various embodiments total air flow, fan air flow, blower air flow, fan ducting pressure, fan injector pressure, blower return pressure, blower supply pressure, total supply duct pressure, total building pressure (relative to the outdoors), or some combination of these, might be used to determine whether or not to selectively control the fan 1038, blower of the device 1010, and/or the damper 1060.

In one exemplary embodiment, the fan 1038 utilizes an ECM, the blower of the device 10 utilizes an ECM, and the HVAC system is capable of variable output or modulating heating and/or cooling. In this embodiment, desired total air flow is maintained though the modulation of the respective ECMs which drive the fan 1038 and the blower of the device 1010. In one embodiment, desired discharge air temperature of the supply line 1020 is maintained by the combination and the use of, the modulation of injection fan, the modulation of the blower of the device 10, and/or the modulation of the heating and/or cooling devices. Additionally, air velocities at the point of the air terminals may have significant impact on the efficiency and the noise produced by the system. For example: if the air velocity at the air terminal is too high, then excessive noise may result, but if the air velocity is too low, significant air stratification might occur.

In one embodiment, the device 1050 may control an ECM to deliver a constant volumetric flow of air, which can be measured in units of cubic feet per minute (CFM) despite any minor changes in static pressures. A constant, relatively consistent volumetric air flow may be provided by adjusting or modulating the rotations per minute (RPM) of the blower of the device 1010 appropriately and/or the fan 1038. In some embodiments, real-time modulation of the CFM setpoint may be performed either directly or indirectly by the device 1050.

In some embodiments, the device 1050 controls the blower of the device 10 and the fan 1038 in an inversely proportional manner based upon CFM output. For example, the fan 1038 may be controlled to increase CFM output, while the blower of the device 1010 is controlled to reduce positive CFM output. In another exemplary embodiment the device 1050 maintains blower CFM rates only slightly above the freezing point of the evaporator coil, thereby providing for a more effective means of dehumidifying the air stream. In one exemplary embodiment, the device 1050 may be selectively configurable to allow for maximum output of both the blower of the device 1010 and the fan 1038. In one embodiment, VFD(s) are utilized to control fan output(s), much in the same way as embodiments described herein were expressed relating to ECM control and operation and wherein other multi-speed motor(s) are used, as one skilled in the art will recognize upon careful examination of the teachings herein disclosed.

For CFM setpoint control requiring proportionality, or any deviation based on proportionality, temperature sensors and/or peto tubes or other techniques for determining volumetric flow may be utilized based on the following:

$$\% \text{ VFODA} = (\text{SAT}-\text{MAT})/(\text{SAT}-\text{ODAT})*100$$

Where
- ODAT represents an outdoor air temperature which can be measured using sensor 52, and
- SAT represents a supply air temperature, which may be measured from sensor 54 or a sensor within the supply line 1020, downstream of an end of the duct 1036, and
- MAT represents a mixed air temperature which may be measured from a sensor within a supply-plenum, and
- % VFODA represents the percent of volumetric flow of outdoor air.

In one embodiment, the device 1050 may calibrate a natural variation in accuracy between the SAT sensor and the MAT sensor by disabling the injection of outdoor air and operating the blower for a short period of time before making provision in the computer code such that the two sensors read the exact same value, or a value which is closer to the same. In this manor, though a resistance-based thermistor may have differing resistance values, as far as the computer code is concerned, at the time of calibration, those two thermistors will effectively have the same resistance in the computer code functionality. In one embodiment the calibration time may last for one minute, and in another the calibration time may last for three minutes, etc.

In one embodiment a structure equipped with fresh air supply injection apparatus 1030 also has a barometric relief damper which allows for the relief of pressure from within the structure via the discharge of indoor air to the outdoors.

Figure 21:
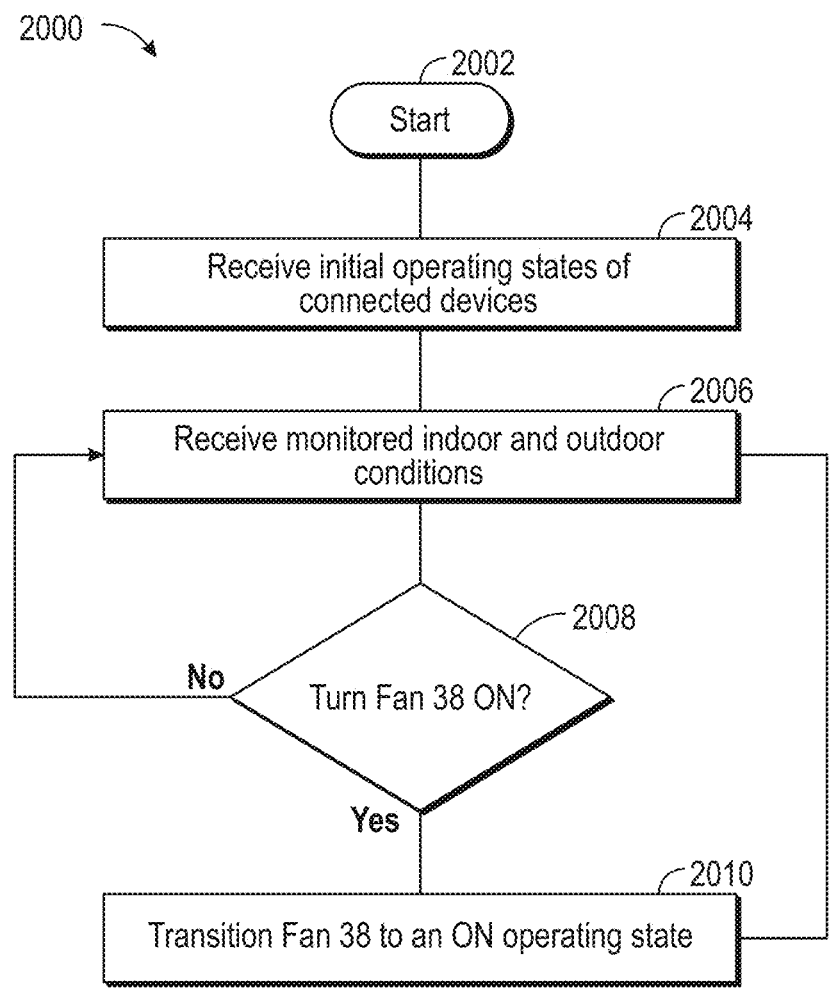
FIG. 21 shows an exemplary process for supplying fresh outdoor air into a building structure, in accordance with the present disclosure.

FIG. 21 shows an exemplary process 2000 for supplying fresh outdoor air into a building structure 1002. The process 2000 may be utilized in conjunction with the system 1000, the device 1050 and one or more of the sensors 1052 and 1054.

The process 2000 may be initialized 2002 manually or automatically in accordance with other executing processes. In one embodiment, the process 2000 is initialized 2002 by simply turning the device 1050 to an ON operating state. In one embodiment, the process 2000 is initialized by receiving instructions from a computer program to start. In one embodiment, one or more criteria may be used to initiate the process 2000 including, e.g., temperature below a threshold for a predefined time period at within a pre-defined time range of a day.

At step 2004, in one embodiment, after initiation 2002 of the process 2000, the device 1050 receives operating states of connected device, e.g., the device 1010, the fan 1038, a damper 1060, an exterior fan 1040, and one or more sensors 1052 and 1054. In one embodiment, the device 1050 includes pre-defined indoor temperature and humidity set-points. In one embodiment, the device 1050 receives set-points from a user.

At step 2006, the device 1050 receives monitored information from one or more of the connected devices. The sensors 1052 and 1054 may be configured to send temperature and/or humidity data and/or enthalpy data. The device 1010 may be configured to send set-points, in some embodiments.

At step 2008, the device 1050 determines whether the fan 1038 should be transitioned to an ON operating state. In various embodiments, which may depend upon a particular building setup, environmental conditions of the area, time of year, etc., the decision to transition to the ON operating state may be based upon receiving information from the sensors 1052 and 1054, temperature set-points, and time-of-day. In one embodiment, the device 1050 transitions the Fan 1038 to an ON operating state if the indoor temperature is greater than a predefined threshold, the outdoor temperature is less than a predefined threshold, and the setpoint is less than an indoor temperature or close to the indoor temperature. In one embodiment, humidity of the indoor and outdoor sensors are used in conjunction with temperature to determine whether or not to transition the fan 1038 to the ON operating state. In one embodiment, humidity data may be used to adjust temperature readings to generate a metric, which may then be used to determine whether or not to transition the fan 1038 to the ON operating state.

In one embodiment, the device 1050 is configured to transition the fan 1038 from the OFF operating state to the ON operating state at a pre-defined time of day. In one embodiment, the device 1050 is configured to transition the fan 1038 from the OFF operating state to the ON operating state at a pre-defined time of day only when the temperature and humidity readings are preferential. In one embodiment, the device 1050 transitions the fan 1038 to the ON operating state for a predefined threshold time, and once elapsed, transitions to the OFF operating state. Likewise, in various embodiments, the device 1050 may transition the exterior fan 40.

At step 2010, the device 1050 transitions the fan 1038 to an ON operating state. In various embodiments, the device 1050 may continue monitoring temperature, humidity, and operating state information to determine when and whether to transition back to the OFF operating state.

In one embodiment, the device 1050 may activate the fan 1038 without activating the blower of the device 1010. The fan 1038 may be energized before, during, or after a call for cooling, when outdoor air temperatures are desirous for precooling or cooling. In another embodiment the device 1050 may activate based on the variable YODAT. In another embodiment the device 1050 may activate in order to transfer a heat-energy (e.g., NTotal_heat_transferred). In another embodiment, the device 1050 may activate in response to a CO2 sensor.

The schematic flow chart diagrams included herein are generally set forth as logical flow chart diagrams. As such, the depicted order and labeled steps are indicative of one embodiment of the presented process. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the process. For example, an arrow may indicate a waiting or monitoring period of unspecified duration between enumerated steps of the depicted process. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code. A supply line or supply duct may be considered a supply plenum. A supply plenum may be considered a supply line or a supply duct. A supply duct may be considered a supply line. A supply line may be considered a supply duct.

Additionally, the order in which a particular method occurs may or may not strictly adhere to the order of the corresponding steps shown. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures. For example, steps 2004 and 2006 may be executed concurrently in some embodiments.

Additionally, examples in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing.

As used herein, the "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. Further, the term "plurality" can be defined as "at least two."

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

The disclosure has described certain preferred embodiments and modifications thereto. Further modifications and alterations may occur to others upon reading and understanding the specification. Therefore, it is intended that the disclosure not be limited to the particular embodiment(s) disclosed for carrying out this disclosure, but that the disclosure will include all embodiments falling within the scope of the appended claims.

The invention claimed is:

1. A method for operating a temperature control system for a structure, the method comprising:
   monitoring historical data;
   controlling the temperature control system to inject outdoor air into the supply duct of the temperature control system based upon historical data;
   monitoring indoor and outdoor temperatures;
   monitoring a temperature setpoint of the temperature control system;
   defining a first time range and a second time range;
   associating one or more operating parameters of the temperature control system with the first time range;
   associating one or more operating parameters of the temperature control system with the second time range;
   monitoring operational time and operational load of the temperature control system for the first time range; and
   further controlling the temperature control system to selectively injecting fresh outside air into a supply line downstream of a heating or air conditioning device during the second time range when the indoor temperature is greater than a first predefined threshold, the outdoor temperature is less than a second predefined threshold, and the temperature setpoint is less than a monitored indoor temperature or within a range of the monitored indoor temperature, wherein the injecting is at an injection duct, and wherein the injection duct is substantially parallel to the supply line, wherein the injecting is executed based upon the monitored operational time and operational load of the temperature control system in the first time range, and the monitored indoor and outdoor temperatures.

2. The method of claim 1, wherein historical data comprises heat transfer information.

3. The method of claim 1, wherein historical data comprises historical outdoor air temperatures and historical user set point data.

4. The method of claim 1, wherein the injection duct is encased within the supply line, centrally disposed within the supply line, and terminates downstream of the heating or air conditioning device within the supply line, which has a length greater than the injection duct,
   wherein the injection duct is inserted through the supply line downstream of the heating or air conditioning device,
   wherein injecting fresh outside air into a supply line based upon the monitoring is executed by transmitting a command to a fan in gaseous communication between an exterior vent and the supply line, and
   wherein the injection duct is centrally disposed within the supply line via one or more mechanical elements.

5. The method of claim 1, further comprising:
   receiving an operating state status of a fan within a duct portion configured for gaseous communication between an exterior vent and the supply line.

6. The method of claim 5, wherein injecting fresh outside air into a supply line based upon the monitoring is executed by transmitting a command to a fan in gaseous communication between an exterior vent and the supply line.

7. The method of claim 6, wherein selectively injecting fresh outside air into a supply line based upon the monitoring is executed using an injection duct having a circular cross-sectional shape.

8. The method of claim 1, wherein the injection duct is centrally disposed within the supply line via one or more mechanical element.

9. The method of claim 1, wherein the injection duct is disposed within the supply line on a wall thereof.

10. The method of claim 1, wherein the temperature control system further comprises:
    an exterior vent;
    a fan configured to selectively draw in outside air;
    a damper within the duct run proximate to the exterior vent; and
    a duct run connected to the exterior vent, to bypass a heating or air conditioning device, and terminating within the supply line, wherein the duct run is substantially parallel to the supply line, encased within the supply line, and terminates downstream of the heating or air conditioning device within the supply line, which has a length greater than the duct run, wherein the duct run is disposed through a supply-plenum to the supply line, wherein the duct run is perpendicular to an initial air direction from the heating or air conditioning device.

11. The indoor climate control device of claim 10, wherein the duct run has an end in a circular cross-sectional shape.

12. The indoor climate control device of claim 10, wherein the duct run is centrally disposed within the supply line via one or more mechanical elements.

13. A method for operating a ventilation system and a cooling system to vent outside air within a structure, the method comprising:
    monitoring an interior temperature of the structure;
    monitoring an exterior temperature of ambient air outside of the structure;
    defining a first time range and a second time range, wherein the second time range comprises a duration less than the first time range;
    associating one or more operating parameters of the ventilation system and the cooling system with the first time range;
    associating one or more operating parameters of the ventilation system and the cooling system with the second time range;
    monitoring operational time and operational load of the cooling system for the first time range;
    controlling the ventilation system during the second time range based upon the monitored operational time and operational load of the cooling system for the first time range, the monitored interior and exterior temperatures, and the one or more operating parameters of the cooling system associated with the second time range; and
    executing a first sum of products calculation for operational time and operational load of the cooling system associated with the first time range;
    executing a second sum of products calculation for operational time and operational load of a heating system associated with the first time range;
    comparing the second sum of products to the first sum of products; and
    controlling the ventilation system to an ON operating state during the second time range based upon the comparing.

14. The method of claim 13, wherein the comparing returns a discrete indication.

15. The method of claim 13, wherein the comparing returns a binary value being expressed in relation to a numerical value that is greater than, equal to, or less than a biased numerical value derived from a difference between the first sum of products calculation for operational time and operational load of the cooling system associated with the first time range and a second sum of products calculation for operational time and operational load of a heating system associated with the first time range.

16. The method of claim 13, wherein the comparing returns a binary value being expressed in relation to a numerical value that is greater than, equal to, or less than an un-biased numerical value derived from a difference between the first sum of products calculation for operational time and operational load of the cooling system associated with the first time range and a second sum of products calculation for operational time and operational load of a heating system associated with the first time range.

17. The method of claim 13, wherein the comparing returns a binary value being expressed in relation to a numerical value that is greater than, equal to, or less than an un-biased numerical value derived from a difference between the second sum of products calculation for operational time and operational load of a heating system associated with the first time range and a first sum of products calculation for operational time and operational load of the cooling system associated with the first time range.

18. The method of claim 13, wherein the comparing returns a binary value being expressed in relation to a numerical value that is greater than, equal to, or less than an biased numerical value derived from a difference between the second sum of products calculation for operational time and operational load of a heating system associated with the first time range and a first sum of products calculation for operational time and operational load of the cooling system associated with the first time range.

19. The method of claim 13, wherein the executing the first sum of products is executed using a first integral calculation and wherein executing the second sum of products is executed using a second integral calculation.

20. The method of claim 13, wherein the controlling is further executed based upon at least one biasing value; and wherein at least one of a start time and an end time of the second time range is determined based upon photo sensor measurements from a prior time period, and wherein the second time range comprises a predefined duration.

21. The method of claim 13, wherein the one or more operating parameters of the cooling system with the first time range includes a heating set point; and further controlling the ventilation system during the second time range to cool the structure to a temperature associated with the heating set point associated with the first time range.

22. The method of claim 13, wherein the one or more operating parameters of the ventilation system and the cooling system with the first time range includes a heating set point; and further controlling the ventilation system during the second time range to cool the structure to a temperature of the heating set point associated with the first time range plus a predefined buffer temperature.

23. The method of claim 13, wherein the one or more operating parameters of the ventilation system and the cooling system associated with the first time range includes a heating set point and a cooling set point; and further controlling the ventilation system during the second time range to cool the structure to a temperature of
ocsp-(ocsp-ohsp)*udbv
wherein
ocsp=occupied cooling set point;
ohsp=occupied heating set point;
ohsp≤ocsp; and
udbv=a predefined biasing value between 0 and 1.

24. The method of claim 13, further comprising:
comparing the monitored interior temperature to the monitored exterior temperature; and
further controlling the ventilation system based upon the comparing.

25. The method of claim 13, wherein the comparing is executed based upon a differencing between the first sum of products and the second sum of products.

* * * * *